United States Patent
Lee

(10) Patent No.: US 10,102,415 B1
(45) Date of Patent: Oct. 16, 2018

(54) METHOD AND APPARATUS FOR SIMULTANEOUS MULTIPLE FINGERPRINT ENROLLMENT

(71) Applicant: SecuGen Corporation, Santa Clara, CA (US)

(72) Inventor: Dong Won Lee, San Jose, CA (US)

(73) Assignee: SecuGen Corporation, Santa Clara, CA (US)

( * ) Notice: Subject to any disclaimer, the term of this patent is extended or adjusted under 35 U.S.C. 154(b) by 0 days.

(21) Appl. No.: 15/940,751

(22) Filed: Mar. 29, 2018

(51) Int. Cl.
*G06K 9/00* (2006.01)
*G06K 9/62* (2006.01)
*G06F 21/32* (2013.01)
*G06T 7/10* (2017.01)

(52) U.S. Cl.
CPC ......... *G06K 9/00046* (2013.01); *G06F 21/32* (2013.01); *G06K 9/001* (2013.01); *G06K 9/6212* (2013.01); *G06T 7/10* (2017.01)

(58) Field of Classification Search
None
See application file for complete search history.

(56) References Cited

U.S. PATENT DOCUMENTS

| | | | | |
|---|---|---|---|---|
| 2003/0133143 A1* | 7/2003 | McClurg | ............ | G06K 9/00013 358/1.14 |
| 2005/0111709 A1* | 5/2005 | Topping | ................ | F41A 17/066 382/124 |
| 2005/0169506 A1* | 8/2005 | Fenrich | ............... | G06K 9/00026 382/127 |
| 2010/0113952 A1* | 5/2010 | Raguin | ................ | G06K 9/0012 600/509 |
| 2013/0100267 A1* | 4/2013 | Baek | ................... | G06K 9/00067 348/77 |
| 2014/0079300 A1* | 3/2014 | Wolfer | ............... | G06K 9/00013 382/124 |
| 2015/0278577 A1* | 10/2015 | Cho | ........................ | G06F 3/041 382/124 |
| 2016/0246396 A1* | 8/2016 | Dickinson | ........... | G06F 3/03545 |
| 2017/0032166 A1* | 2/2017 | Raguin | ................... | G06F 3/033 |

OTHER PUBLICATIONS

Rowe, Robert K., et al. "A multispectral whole-hand biometric authentication system." Biometrics Symposium, 2007. IEEE, 2007. 6 pages (Year: 2007).*

* cited by examiner

*Primary Examiner* — Ryan P Potts
(74) *Attorney, Agent, or Firm* — Silicon Valley Patent Group LLP; Thomas Chan

(57) ABSTRACT

The present disclosure relates to simultaneous multiple fingerprint enrollment in the field of fingerprint detection and authentication. The enrollment apparatus is configured to perform the following procedures: instruct a user to present a randomly selected set of multiple fingers on a sensing surface of the enrollment apparatus interactively, capture a fingerprint image of the multiple fingers on the sensing surface simultaneously, identify boundaries of the multiple fingers by scanning from edges of the sensing surface of the enrollment apparatus, segment the fingerprint image into a plurality of individual fingerprint images based on the identified boundaries, and store the individual fingerprint images.

20 Claims, 28 Drawing Sheets

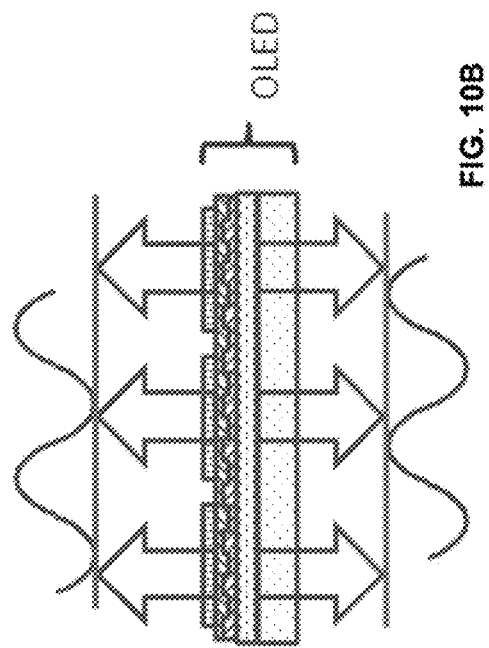
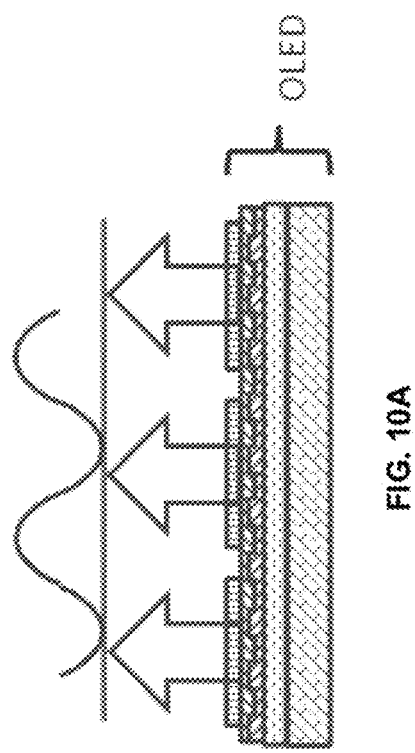
FIG. 10A
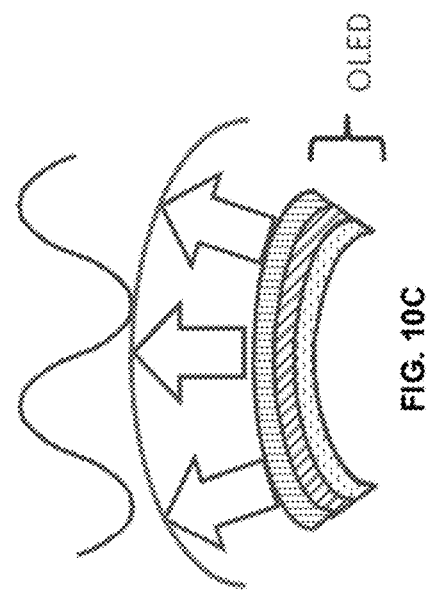
FIG. 10B
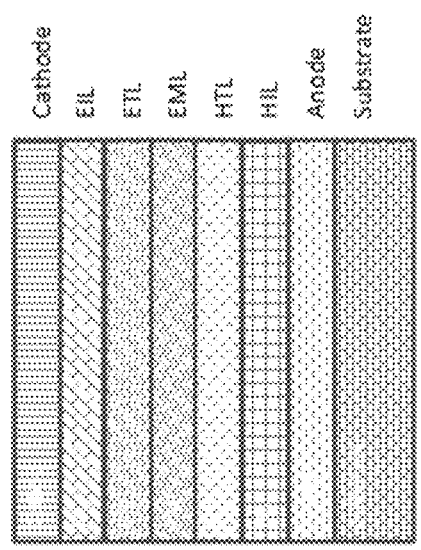
FIG. 10C
FIG. 10D

METHOD AND APPARATUS FOR SIMULTANEOUS MULTIPLE FINGERPRINT ENROLLMENT

FIELD

The present invention relates to the field of fingerprint detection system. In particular, the present invention relates to method and apparatus for simultaneous multiple fingerprint enrollment.

BACKGROUND

Rolled fingerprint images are obtained by rolling a finger from one side to the other ("from nail to nail") in order to capture a substantial area of a finger. Since rolling a finger can introduce distortion, rolled fingerprints are usually acquired in an attended mode. Rolling speed and pressure during the rolling can cause distortion on scanned fingerprint images. Plain fingerprint images are those in which the finger is pressed down on a flat surface but not rolled. Using the same rolled finger scanning device, multiple plain impressions can be taken simultaneously without rolling. These are referred to as plain, slap, or flat impressions. While a plain impression covers a smaller area than rolled fingerprint, they typically do not have the distortion introduced during rolling. In conventional fingerprint scanning devices, an operator or user is typically instructed to roll a finger in one direction from nail to nail.

It is desirable to have an efficient fingerprint enrollment apparatus that can address the deficiencies of conventional fingerprint scanning devices and also handle various rolling scenarios including, 1) rolling left to right; 2) rolling right to left; 3) start rolling near the center of the sensing surface of a fingerprint enrollment apparatus, then rolls first to the left and then to the right; 4) start rolling near the center of the sensing surface of a fingerprint enrollment apparatus, then rolls first to the right and then to the left; and 5) processing randomly selected multiple fingers simultaneously.

SUMMARY

Method and apparatus are provided for simultaneous multiple fingerprint enrollment. In one embodiment, in one embodiment, a method for simultaneous interactive multiple fingerprint enrollment may include instructing, by a controller, a user to present a randomly selected set of multiple fingers on a sensing surface of an enrollment apparatus interactively, capturing, by an image sensor, a fingerprint image of the multiple fingers on the sensing surface simultaneously, identifying, by the controller, boundaries of the multiple fingers by scanning from edges of the sensing surface of the fingerprint enrollment apparatus, segmenting, by the controller, the fingerprint image into a plurality of individual fingerprint images based on the identified boundaries, and storing, in a memory, the individual fingerprint images.

In another embodiment, an apparatus for simultaneous interactive multiple fingerprint enrollment may include a controller configured to instruct a user to present a randomly selected set of multiple fingers on a sensing surface of an enrollment apparatus interactively, an image sensor configured to capture a fingerprint image of the multiple fingers on the sensing surface simultaneously, the controller is further configured to identify boundaries of the multiple fingers by scanning from edges of the sensing surface of the fingerprint enrollment apparatus, the controller is further configured to segment the fingerprint image into a plurality of individual fingerprint images based on the identified boundaries, and a memory configured to store the individual fingerprint images.

In yet another embodiment, a method for enrolling a fingerprint image may include instructing, by a controller, a user to roll a finger across a sensing surface of a fingerprint enrollment apparatus, capturing, by an image sensor, a current fingerprint image of the finger, capturing, by the image sensor, a next fingerprint image as the finger rolls across the sensing surface of the fingerprint enrollment apparatus, where the next fingerprint image is contiguous to the current fingerprint image, stitching, by the controller, the next fingerprint image to the current fingerprint image to form a stitched fingerprint image, determining, by the controller, whether the stitched fingerprint image meets fingerprint enrollment criteria, and storing, in a memory, the stitched fingerprint image in response to the stitched fingerprint image meets the fingerprint enrollment criteria.

In yet another embodiment, an apparatus for enrolling a fingerprint image may include a controller configured to instruct a user to roll a finger across a sensing surface of a fingerprint enrollment apparatus, an image sensor configured to capture a current fingerprint image of the finger, the image sensor is further configured to capture a next fingerprint image as the finger rolls across the sensing surface of the fingerprint enrollment apparatus, wherein the next fingerprint image is contiguous to the current fingerprint image, the controller is further configured to stitch the next fingerprint image to the current fingerprint image to form a stitched fingerprint image, the controller is further configured to determine whether the stitched fingerprint image meets fingerprint enrollment criteria, and a memory configured to store the stitched fingerprint image in response to the stitched fingerprint image meets the fingerprint enrollment criteria.

To obtain a rolled fingerprint image, a fingerprint enrollment apparatus may be configured to continuously capture series of plain images, and to form an accurate rolled image by stitching and overlaying the images. A rolled fingerprint scanner device can require higher computational resources and image sampling rate than a typical plain fingerprint scanner because it needs to capture continuously while the finger is rolling. It is desirable to roll at a steady pace, and with constant pressure. In practical applications where changing speed or pressure may cause smudges, the sampling rate can be adjusted higher as the rate of rotation becomes faster.

BRIEF DESCRIPTION OF THE DRAWINGS

The aforementioned features and advantages of the disclosure, as well as additional features and advantages thereof, will be more clearly understandable after reading detailed descriptions of embodiments of the disclosure in conjunction with the non-limiting and non-exhaustive aspects of following drawings.

FIG. 10A illustrates a unidirectional OLED with fingerprint sensors according to aspects of the present disclosure; FIG. 10B illustrates a bi-directional OLED with fingerprint sensors according to aspects of the present disclosure; FIG. 10C illustrates a conformable OLED with fingerprint sensors according to aspects of the present disclosure; FIG. 10D illustrates an exemplary OLED structure according to aspects of the present disclosure.

DESCRIPTION OF EMBODIMENTS

Method and apparatus are provided for simultaneous multiple fingerprint enrollment and authentication. The following descriptions are presented to enable any person skilled in the art to make and use the disclosure. Descriptions of specific embodiments and applications are provided only as examples. Various modifications and combinations of the examples described herein will be readily apparent to those skilled in the art, and the general principles defined herein may be applied to other examples and applications without departing from the scope of the disclosure. Thus, the present disclosure is not intended to be limited to the examples described and shown, but is to be accorded the scope consistent with the principles and features disclosed herein. The word "exemplary" or "example" is used herein to mean "serving as an example, instance, or illustration." Any aspect or embodiment described herein as "exemplary" or as an "example" in not necessarily to be construed as preferred or advantageous over other aspects or embodiments.

Figure 1A:
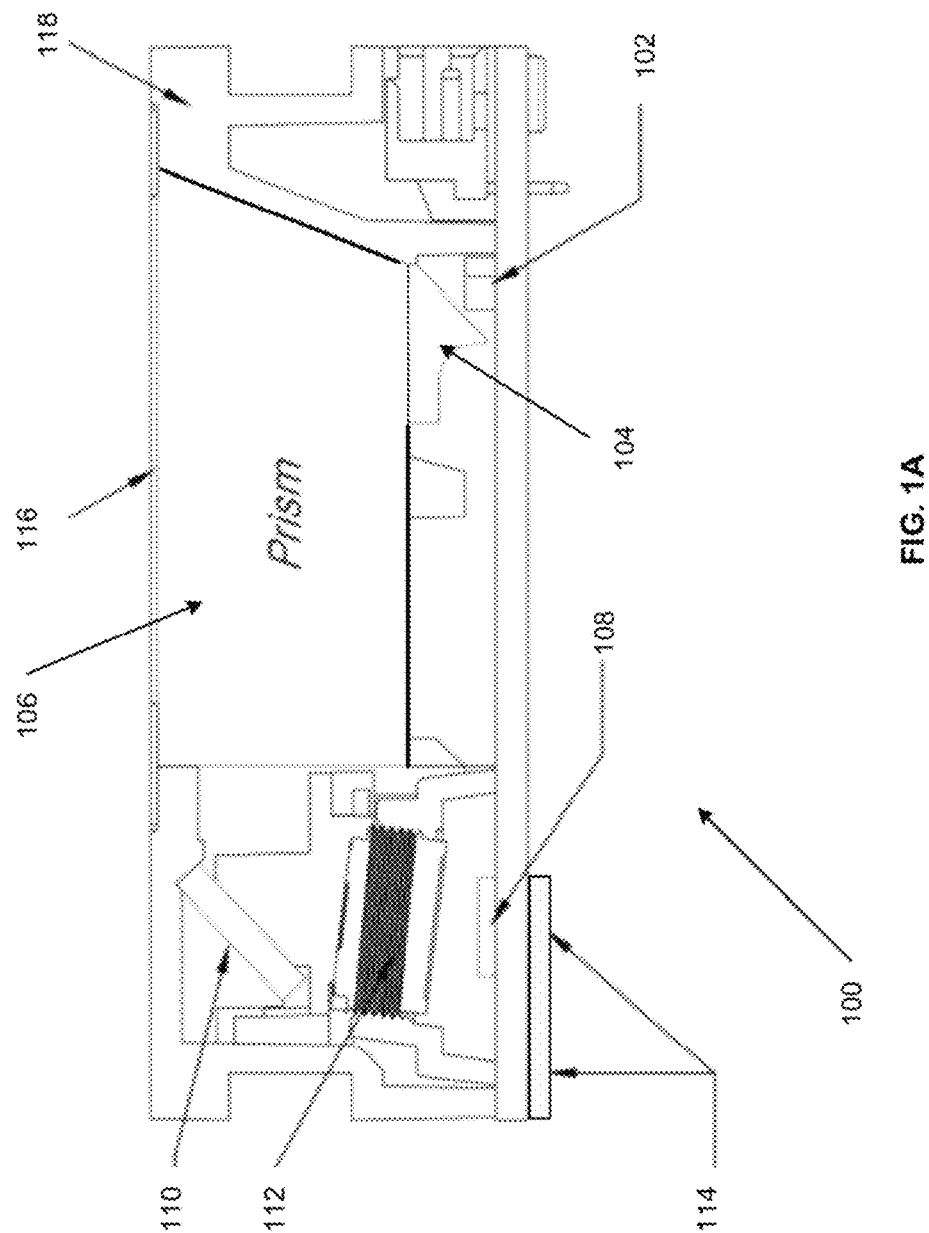
FIG. 1A illustrates an exemplary fingerprint sensing apparatus according to aspects of the present disclosure.

FIG. 1A illustrates an exemplary fingerprint sensing apparatus according to aspects of the present disclosure. In the example shown in FIG. 1, the fingerprint sensing apparatus 100 includes a light source 102, a light modifier 104, a prism 106, an image sensor 108, a mirror 110, a lens 112, a printed circuit board 114, a platen 116 for finger placement, and a housing 118. The light source 102, light modifier 104, prism 106, image sensor 108, mirror 110, lens 112, printed circuit board 114, platen 116 and various other components are assembled within the housing 118 and arranged in the manner shown in FIG. 1A.

According to aspects of the present disclosure, the light source 102 is configured produce an emitted light to illuminate a fingerprint of a user. The light modifier 104 is configured to illuminate the fingerprint with a substantially uniform light intensity using the emitted light from the light source, where the light modifier 104 includes a curved surface configured to produce a diffused and reflected light based on the emitted light from the light source. The prism 106 is configured to direct a reflected light of the fingerprint illuminated by the diffused and reflected light from the light modifier 104. The image sensor 108 is configured to capture a fingerprint image from the reflected light of the fingerprint. The platen 116 is configured to be touched by a finger of a user. The housing 118 is configured to hold the light source, the light modifier, the prism, and the image sensor within the housing.

In some implementations, there are the mirror 110 and the lens 112 in the light path between the prism 106 and the image sensor 108, where the mirror 110 and the lens 112 are configured to direct the reflected light of the fingerprint image from the prism 106 to the image sensor 108. A printed circuit board 114 may be attached to the housing 118, where the printed circuit board may include integrated circuit components, such as microprocessor(s), static and dynamic memory, application specific integrated circuits, that can be configured to support various applications of the fingerprint sensing apparatus 100.

Figure 1B:
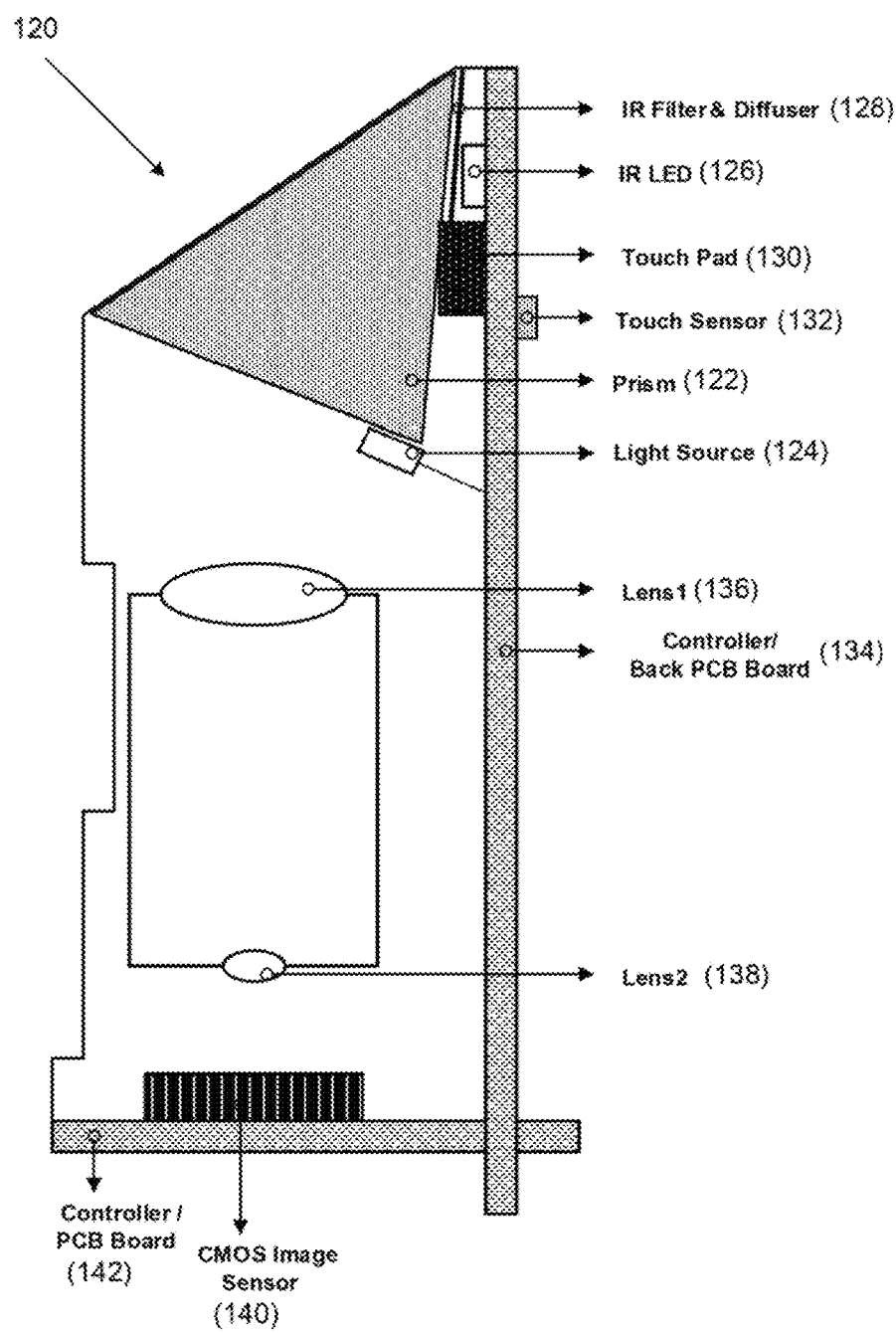
FIG. 1B illustrates a fingerprint recognition device according to embodiments of the present invention.

FIG. 1B illustrates a fingerprint recognition device according to embodiments of the present invention. In the exemplary implementation shown in FIG. 1B, the fingerprint recognition device 120 includes a prism 122, a light source 124, an infrared (IR) light emitting diode (LED) 126, an IR filter and diffuser 128, a touch pad 130, a touch sensor 132, a set of lenses 136 and 138, a CMOS image sensor 140. The light source 124 may be implemented with a red LED, a white LED, or a LED capable of illuminating other colors. The fingerprint recognition device may also include one or more printed circuit boards (PCB), such as controller/back PCB 134, and controller/bottom PCB 142. However, the number and location of the PCBs may vary based on various design requirements.

According to embodiments of the present invention, the prism 122 is a transparent optical element with flat and polished surfaces. It refracts light carrying a fingerprint image (created by touching the prism), and delivers the fingerprint image via lenses 136 and 138, to the CMOS sensor 140. The light source 124 is used to generate a scattered light that illuminate the surface of the fingerprint input side of the prism to create an inverse image. The IR LED 126 is used to generate a direct light that illuminates the surface of the fingerprint input side of the prism to create a direct image. The captured image is a combination of the direct image and the inverse image, where the captured image is used in the process of analyzing fake finger detection. The IR filter and diffuser 128 (can also be referred to as an IR Pass Filter) is located between the prism 122 and the IR LED 126 to allow IR LED 126 light to pass into the prism to block light having wavelengths not in the IR range from passing through. In the example of FIG. 1B, the IR filter 128 blocks light from the light source 124 from passing through in the areas covered by the IR filter 128.

The touch pad 130 is used to transmit touch signal through the prism to the touch sensor when a finger is placed on the surface of the prism. The touch sensor 132 is activated when a finger or an object that increases capacitance level, touches the prism surface of the fingerprint recognition device. The prism has a small conductive characteristic that is capable of delivering a touch signal through the touch pad 130 to the touch sensor 132. The touch sensor 132 may be located anywhere on the PCB board depending on PCB design.

The lenses 136 and 138 are optical elements which transmit and refract light and the fingerprint image from the prism, and deliver it to the CMOS sensor 140. The CMOS sensor 140 captures the actual image that is placed on the prism and passed through the prism and lenses.

A method for enrolling a fingerprint image may include, among other things, detecting a fingerprint image from a captured image, detecting multiple fingerprint images from a captured image, detecting a background area from a captured image, detecting boundary information between the fingerprint image and background, detecting rolling speed, detecting rolling direction, detecting a change in rolling direction, and detecting the overlapped areas between the current fingerprint image and the next fingerprint image.

A captured image may include the fingerprint image and the background area which may be separated by a boundary. A fingerprint image includes finger ridges and valleys. The gray level tonality can be distinctive between a fingerprint ridge and a valley.

Figure 2A:
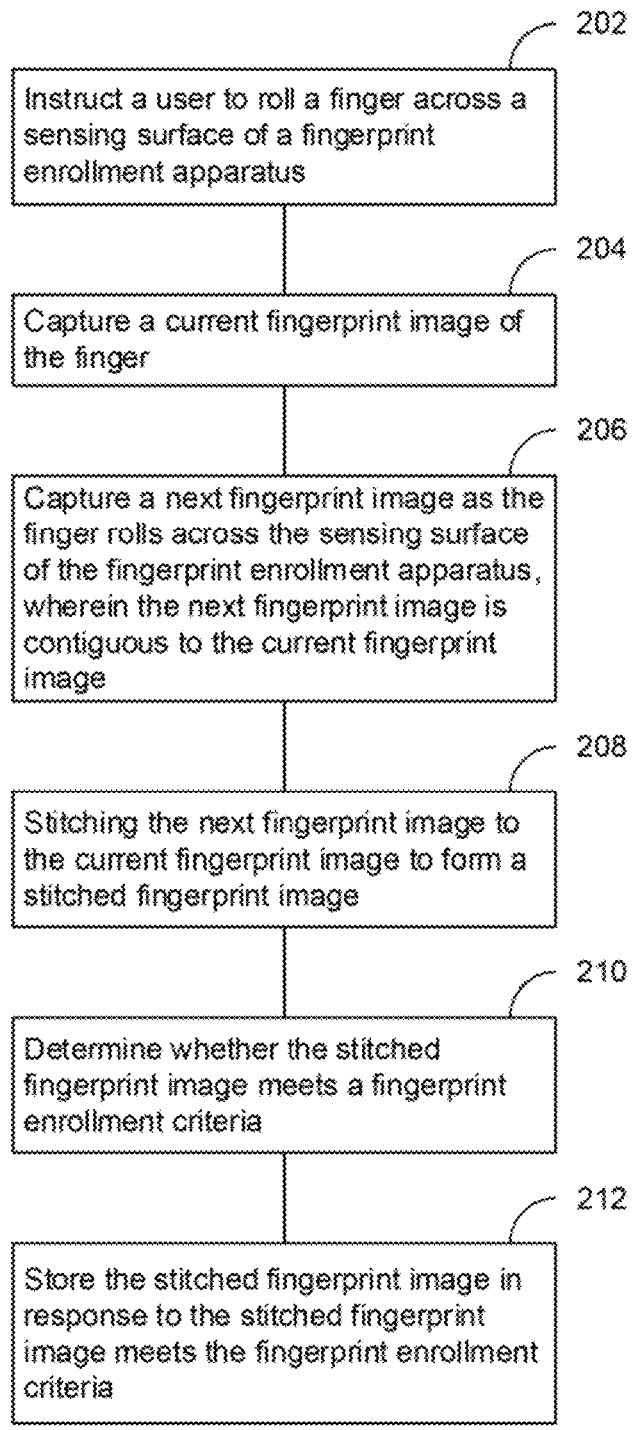
FIG. 2A illustrates an exemplary implementation of enrolling a fingerprint image according to aspects of the present disclosure.

FIG. 2A illustrates an exemplary implementation of enrolling a fingerprint image according to aspects of the present disclosure. As shown in FIG. 2, in block 202, the method instructs a user to roll a finger across a sensing surface of a fingerprint enrollment apparatus. In block 204, the method captures a current fingerprint image of the finger. In block 206, the method captures a next fingerprint image as the finger rolls across the sensing surface of the fingerprint enrollment apparatus, where the next fingerprint image is contiguous to the current fingerprint image. In block 208, the method stitches the next fingerprint image to the current fingerprint image to form a stitched fingerprint image. In block 210, the method determines whether the stitched fingerprint image meets fingerprint enrollment criteria. In block 212, the method stores the stitched fingerprint image in response to the stitched fingerprint image meeting the fingerprint enrollment criteria.

According to aspects of the present disclosure, the fingerprint enrollment criteria may include the stitched fingerprint image reaching a reference image area determined based on age, gender, and height of the user, or the sensing surface of the enrollment apparatus has been covered. The rate of capturing the next fingerprint image may be based on a speed of rolling of the finger.

In some implementations, the method may provide further instructions to the user in response to the stitched fingerprint image not meeting the fingerprint enrollment criteria. For example, the method may instruct the user to repeat the rolling process, instruct the user to roll the finger at a different speed, instruct the user to apply lotion to the fingers, or some combinations thereof.

The fingerprint enrollment criteria are a decision-making process to determine if the rolled fingerprint image (the stitched image) is complete. The fingerprint enrollment criteria are used to determine if the rolled and stitched fingerprint image is complete. The criteria include, among other things, the size of the stitched fingerprint image, the rolling speed, and rolling direction change. An example of the fingerprint enrollment criteria is whether 1) the length of the stitched fingerprint image is greater than a reference value and 2) the height of the stitched fingerprint image is greater than a reference value. In some implementations, these criteria are examined when the rolling speed is near zero or when the rolling direction has changed. Another example of such criteria is whether the size of the stitched fingerprint area is greater than a reference value.

Figure 2B:
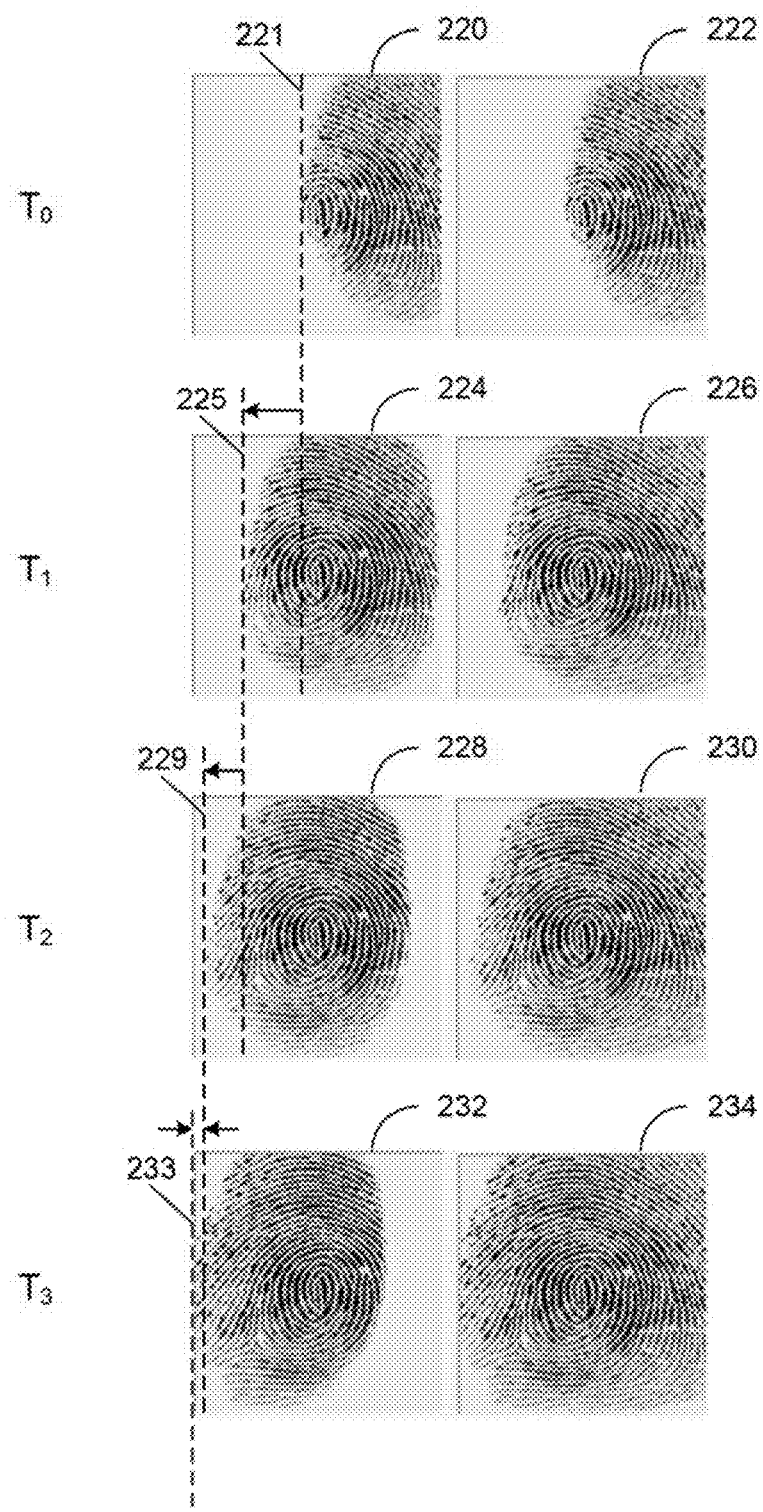
FIG. 2B illustrates an example of enrolling a fingerprint image by rolling a finger from right to left on a sensing surface of a fingerprint enrollment apparatus according to aspects of the present disclosure.

FIG. 2B illustrates an example of enrolling a fingerprint image by rolling a finger from right to left on a sensing surface of a fingerprint enrollment apparatus according to aspects of the present disclosure. As show in the example of FIG. 2B, at time $T_0$, a user's finger touches the sensing surface of the fingerprint enrollment apparatus. A current fingerprint image 220 of the user's finger at $T_0$ is captured by an image sensor. The left leading edge of the current fingerprint image at time $T_0$ is marked by the dotted line 221. Prior to rolling the finger, there is no next fingerprint image captured by the image sensor. The stitched fingerprint image 222 at $T_0$ is the same as the current fingerprint image 220. The method of stitching the current fingerprint image and a next fingerprint image is described below in association with FIG. 6A through FIG. 6F.

At time $T_1$ as the finger rolls from right to left, the stitched fingerprint image from time $T_0$ becomes the current fingerprint image at $T_1$. The next fingerprint image 224 of the user's finger at $T_1$ is captured by the image sensor. The left leading edge of the next fingerprint image at $T_1$ is marked by the dotted line 225. The stitched fingerprint image 226 at $T_1$ is a combination of the current fingerprint image at $T_1$ (which is the previously stitched fingerprint image 222 at $T_0$) and the next fingerprint image 224 captured at $T_1$.

At time $T_2$ as the finger continues to roll from right to left, the stitched fingerprint image from time $T_1$ (226) becomes the current fingerprint image at $T_2$. The next fingerprint image 228 of the user's finger at $T_2$ is captured by the image sensor. The left leading edge of the next fingerprint image 228 at $T_2$ is marked by the dotted line 229. The stitched fingerprint image 230 at $T_2$ is a combination of the current fingerprint image at $T_2$ (which is the previously stitched fingerprint image 226 at $T_1$) and the next fingerprint image 228 captured at $T_2$.

At time $T_3$ as the finger continues to roll from right to left, the stitched fingerprint image from time $T_2$ (230) becomes the current fingerprint image at $T_3$. The next fingerprint image 232 of the user's finger at $T_3$ is captured by the image sensor. The left leading edge of the next fingerprint image 232 at $T_3$ is marked by the dotted line 233. The stitched fingerprint image 234 at $T_3$ is a combination of the current fingerprint image at $T_3$ (which is the previously stitched fingerprint image 230 at $T_2$) and the next fingerprint image 232 captured at $T_3$.

According to aspects of the present disclosure, after a stitched fingerprint image is formed, a controller determines whether the stitched fingerprint image meets a set of fingerprint enrollment criteria. If the set of fingerprint enrollment criteria is met, the controller terminates capturing and processing of additional fingerprint images, and the stitched fingerprint image is stored in a memory. If the set of fingerprint enrollment criteria is not met, the controller continues to capture and process additional fingerprint images as the finger rolls across the scan surface of the enrollment apparatus.

Figure 2C:
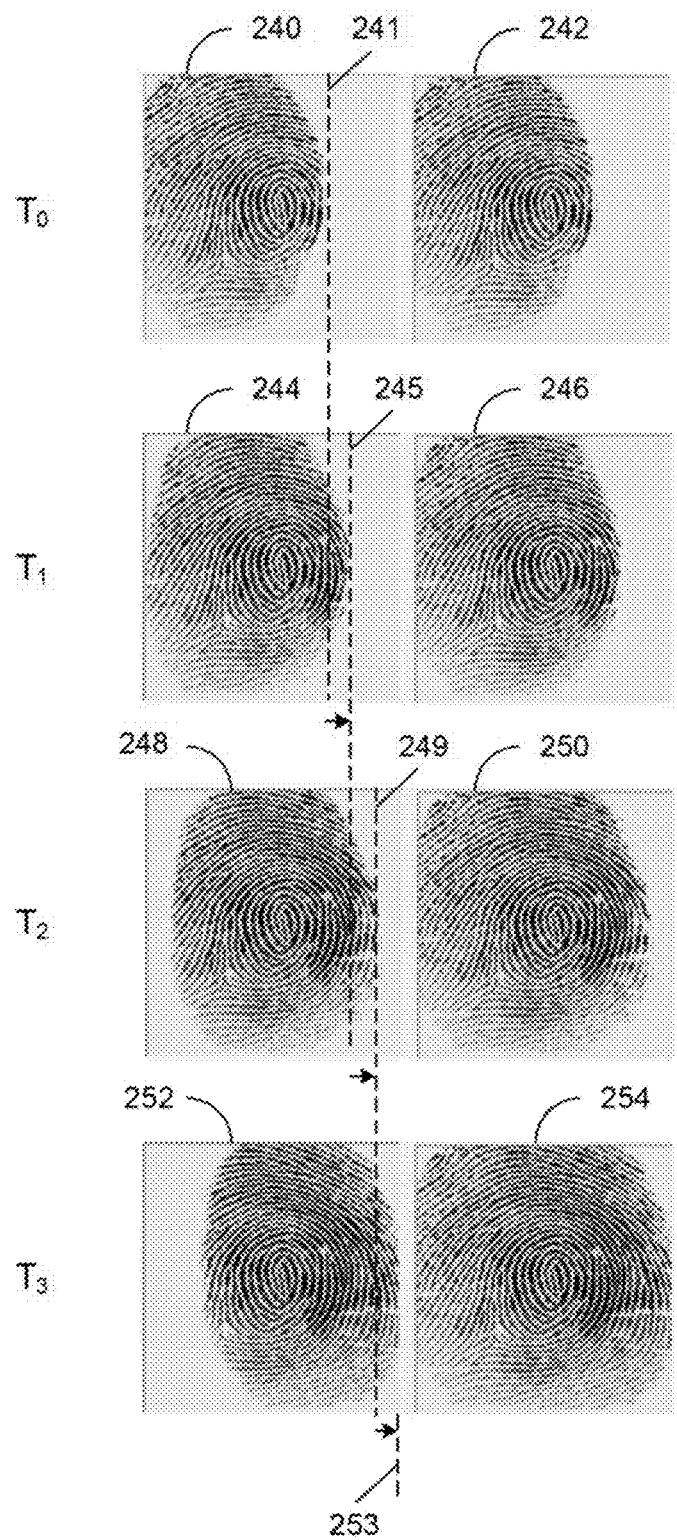
FIG. 2C illustrates an example of enrolling a fingerprint image by rolling a finger from left to right on a sensing surface of a fingerprint enrollment apparatus according to aspects of the present disclosure.

FIG. 2C illustrates an example of enrolling a fingerprint image by rolling a finger from left to right on a sensing surface of a fingerprint enrollment apparatus according to aspects of the present disclosure. As show in FIG. 2C, at time $T_0$, a user's finger touches the sensing surface of the fingerprint enrollment apparatus. A current fingerprint image 240 of the user's finger at $T_0$ is captured by an image sensor. The right leading edge of the current fingerprint image at time $T_0$ is marked by the dotted line 241. Prior to rolling the finger, there is no next fingerprint image captured by the image sensor. The stitched fingerprint image 242 at $T_0$ is the same as the current fingerprint image 240. The method of stitching the current fingerprint image and a next fingerprint image is described below in association with FIG. 6A through FIG. 6F.

At time $T_1$ as the finger rolls from left to right, the stitched fingerprint image from time $T_0$ becomes the current fingerprint image at $T_1$. The next fingerprint image 244 of the user's finger at $T_1$ is captured by the image sensor. The right leading edge of the next fingerprint image at $T_1$ is marked by the dotted line 245. The stitched fingerprint image 246 at $T_1$ is a combination of the current fingerprint image at $T_1$ (which is the previously stitched fingerprint image 242 at $T_0$) and the next fingerprint image 244 captured at $T_1$.

At time $T_2$ as the finger continues to roll from right to left, the stitched fingerprint image from time $T_1$ (246) becomes the current fingerprint image at $T_2$. The next fingerprint image 248 of the user's finger at $T_2$ is captured by the image sensor. The right leading edge of the next fingerprint image 248 at $T_2$ is marked by the dotted line 249. The stitched fingerprint image 250 at $T_2$ is a combination of the current fingerprint image at $T_2$ (which is the previously stitched fingerprint image 246 at $T_1$) and the next fingerprint image 248 captured at $T_2$.

At time $T_3$ as the finger continues to roll from left to right, the stitched fingerprint image from time $T_2$ (250) becomes the current fingerprint image at $T_3$. The next fingerprint image 252 of the user's finger at $T_3$ is captured by the image sensor. The right leading edge of the next fingerprint image 252 at $T_3$ is marked by the dotted line 253. The stitched fingerprint image 254 at $T_3$ is a combination of the current fingerprint image at $T_3$ (which is the previously stitched fingerprint image 250 at $T_2$) and the next fingerprint image 252 captured at $T_3$.

According to aspects of the present disclosure, after a stitched fingerprint image is formed, a controller determines whether the stitched fingerprint image meets a set of fingerprint enrollment criteria. If the set of fingerprint enrollment criteria is met, the controller terminates capturing and processing additional fingerprint images, and the stitched fingerprint image is stored in a memory. If the set of fingerprint enrollment criteria is not met, the controller continues to capture and process additional fingerprint images as the finger rolls across the scan surface of the enrollment apparatus.

Figure 2D:
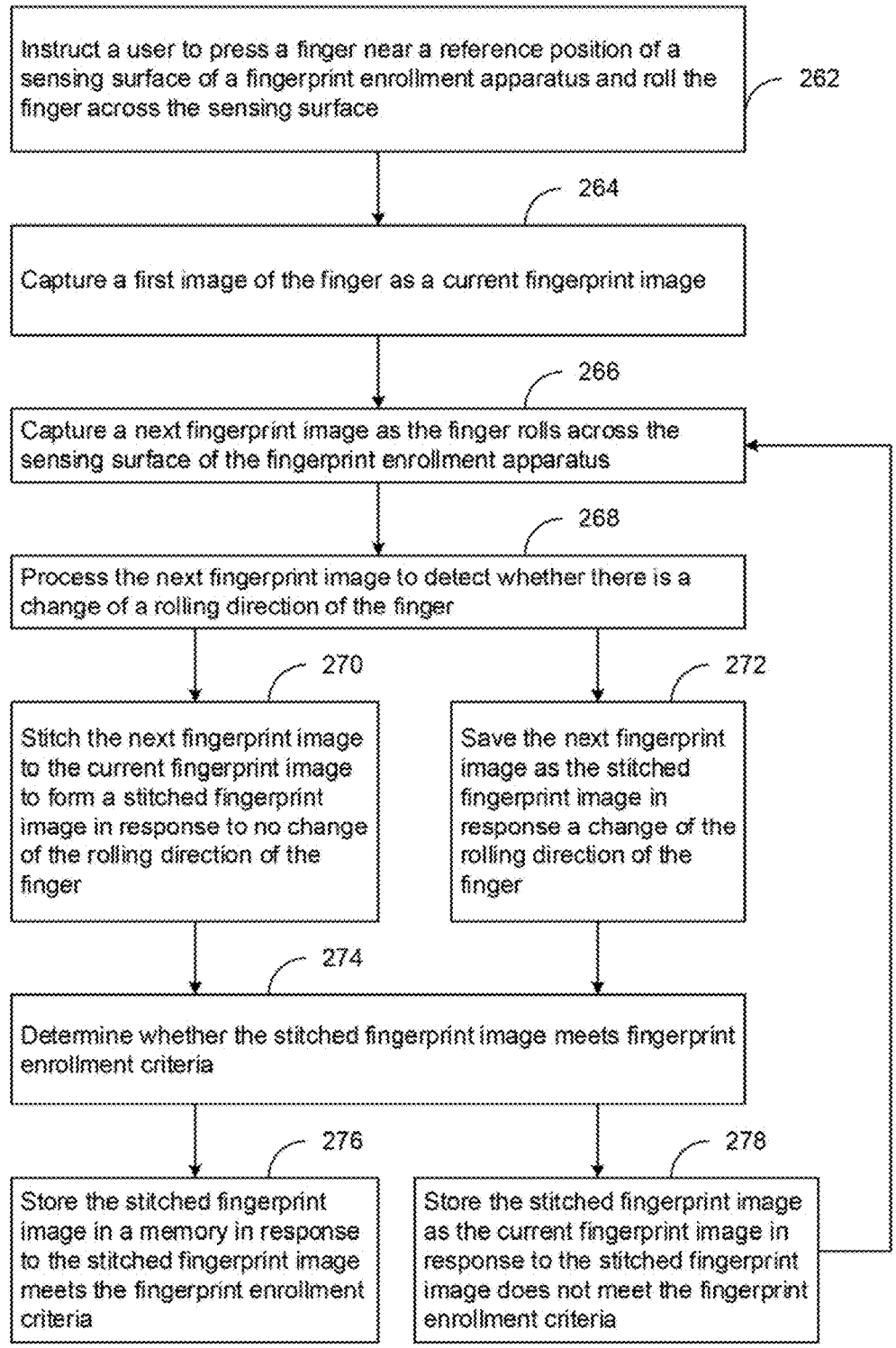
FIG. 2D illustrates another exemplary implementation of enrolling a fingerprint image according to aspects of the present disclosure.

FIG. 2D illustrates another exemplary implementation of enrolling a fingerprint image according to aspects of the present disclosure. As shown in FIG. 2D, in block 262, the method instructs a user to press a finger near a reference position of a sensing surface of a fingerprint enrollment apparatus and roll the finger across the sensing surface. In block 264, the method captures a first image of the finger as a current fingerprint image. In block 266, the method captures a next fingerprint image as the finger rolls across the sensing surface of the fingerprint enrollment apparatus. In block 268, the method processes the next fingerprint image to detect whether there is a change of a rolling direction of the finger. In block 270, the method stitches the next fingerprint image to the current fingerprint image to form a stitched fingerprint image in response to no change of the rolling direction of the finger. In block 272, the method saves the next fingerprint image as the stitched fingerprint image in response to a change of the rolling direction of the finger. In block 274, the method determines whether the stitched fingerprint image meets fingerprint enrollment criteria. In block 276, the method stores the stitched fingerprint image in a memory in response to the stitched fingerprint image meeting the fingerprint enrollment criteria. In block 278, the method stores the stitched fingerprint image as the current fingerprint image in response to the stitched fingerprint image not meeting the fingerprint enrollment criteria, and the method moves to block 266 where it repeats the processes described in blocks 266 to 278.

Figure 2E:
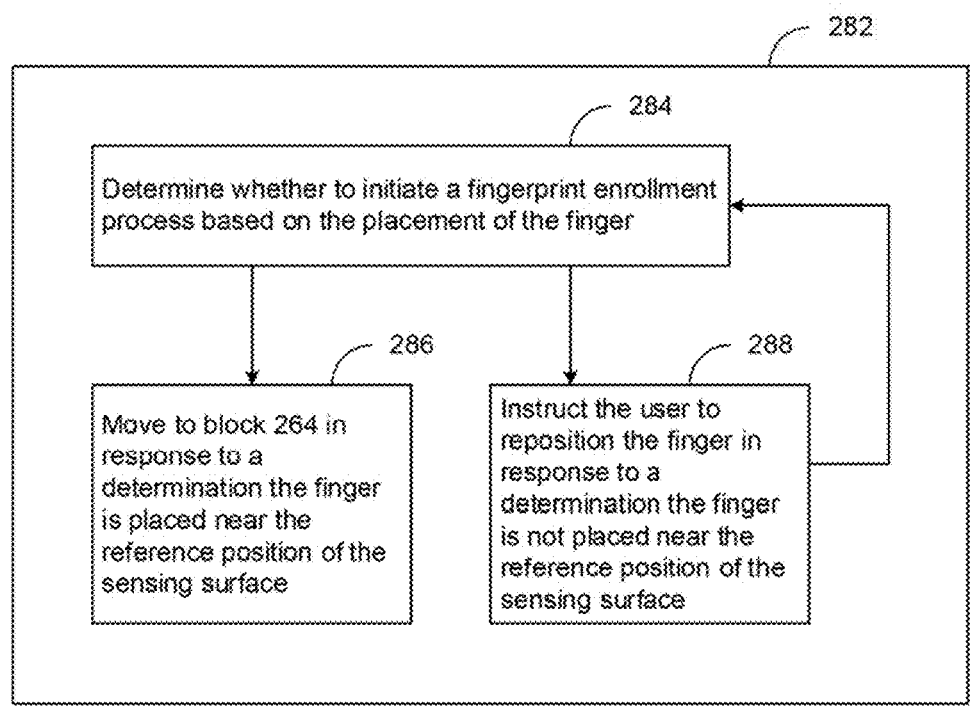
FIG. 2E illustrates an example of detecting whether to initiate a fingerprint enrollment process according to aspects of the present disclosure.

FIG. 2E illustrates an example of detecting whether to initiate a fingerprint enrollment process according to aspects of the present disclosure. In some implementations, the method performed in block 262 of FIG. 2D may include the method performed in block 282 of FIG. 2E. As shown in FIG. 2E, in block 284, the method determines whether to initiate a fingerprint enrollment process based on the placement of the finger. In block 286, the method moves to block 264 of FIG. 2D in response to a determination that the finger is placed near the reference position of the sensing surface. In block 288, the method instructs the user to reposition the finger in response to a determination that the finger is not placed near the reference position of the sensing surface, and the method moves back to block 284 where the method repeats the processes described in blocks 284 to 288.

Figure 3A:
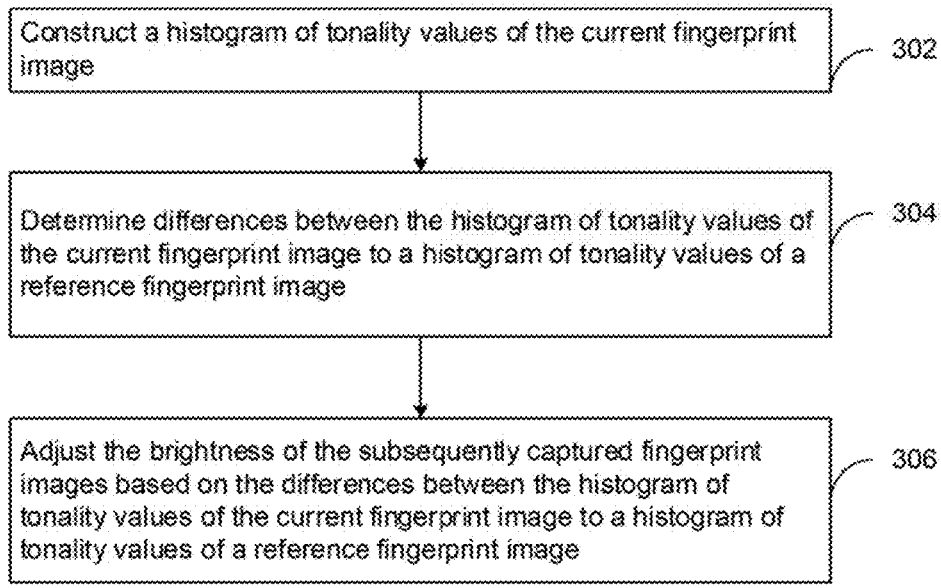
FIG. 3A illustrates an exemplary implementation of calibrating brightness of a captured fingerprint image according to aspects of the present disclosure.

FIG. 3A illustrates an exemplary implementation of calibrating brightness of a captured fingerprint image according to aspects of the present disclosure. In the example shown in FIG. 3A, in block 302, the method constructs a histogram of tonality values of the current fingerprint image. In block 304, the method determines differences between the histogram of tonality values of the current fingerprint image to a histogram of tonality values of a reference fingerprint image. In block 306, the method adjusts the brightness of the subsequently captured fingerprint images based on the differences between the histogram of tonality values of the current fingerprint image to a histogram of tonality values of a reference fingerprint image.

Figure 3B:
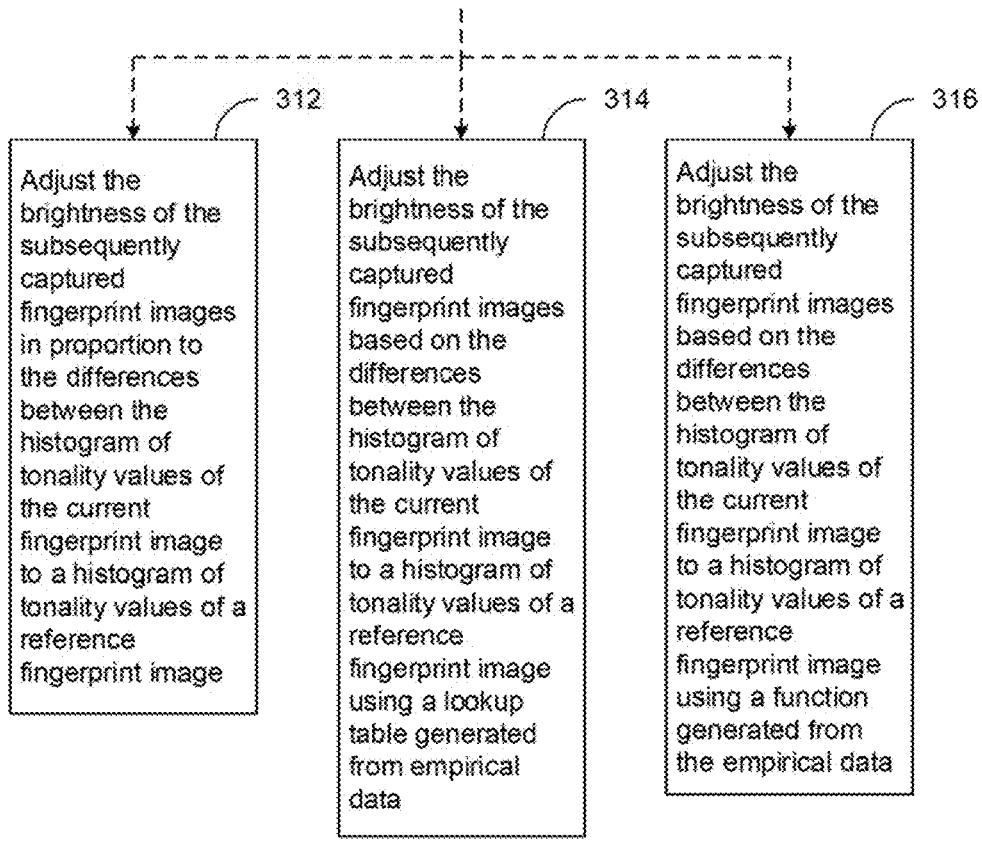
FIG. 3B illustrates exemplary implementations of adjusting the brightness of the subsequently captured fingerprint images according to aspects of the present disclosure.

FIG. 3B illustrates exemplary implementations of adjusting the brightness of the subsequently captured fingerprint images according to aspects of the present disclosure. As shown in FIG. 3B, in block 312, the method adjusts the brightness of the subsequently captured fingerprint images in proportion to the differences between the histogram of tonality values of the current fingerprint image to a histogram of tonality values of a reference fingerprint image. In block 314, the method adjusts the brightness of the subsequently captured fingerprint images based on the differences between the histogram of tonality values of the current fingerprint image to a histogram of tonality values of a reference fingerprint image using a lookup table generated from empirical data. In block 316, the method adjusts the brightness of the subsequently captured fingerprint images based on the differences between the histogram of tonality values of the current fingerprint image to a histogram of tonality values of a reference fingerprint image using a function generated from the empirical data. According to aspects of the present disclosure, any one of the methods described in blocks 312, 314, or 316 may be chosen and performed by a controller.

Figure 4:
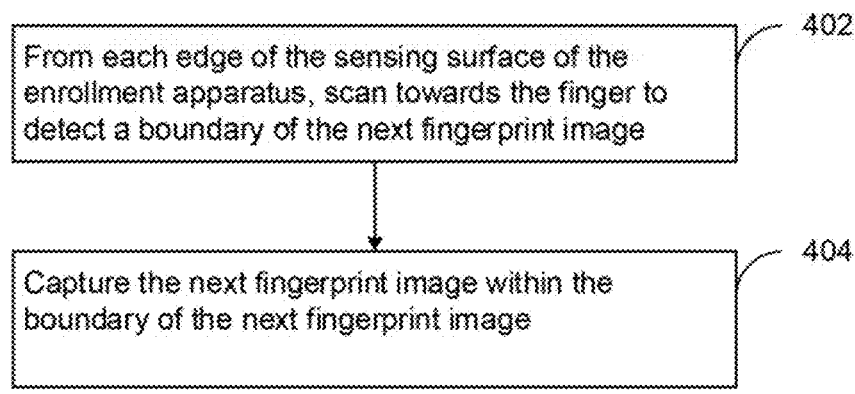
FIG. 4 illustrates an exemplary implementation of capturing a fingerprint image according to aspects of the present disclosure.

FIG. 4 illustrates an exemplary implementation of capturing a fingerprint image according to aspects of the present disclosure. As shown in the example of FIG. 4, in block 402, from each edge of the sensing surface of the enrollment apparatus, the method scans towards the finger to detect a boundary of the fingerprint image. In block 404, the method captures the next fingerprint image within the boundary of the next fingerprint image.

Fingerprint rolling attributes can be detected by comparing the boundary information of the current fingerprint image and the next fingerprint image. The rolling speed can be determined by detecting the change in the boundary positions of the current fingerprint image and the next fingerprint image over time, and the rolling direction can be determined by the change in the rolling speed and the relative position of the boundaries between the current fingerprint image and the next fingerprint image.

If the rolling speed is too fast, the stitched image may not have a desirable result, because the overlapping area between the current fingerprint image and the next fingerprint image is not wide enough to compensate for distortion caused by the rolling action, or there may be missing areas that cannot be stitched to complete the fingerprint image. In some implementations, if the rolling speed is greater than a reference value or the overlapping area is narrower than a reference value, then the current fingerprint image may be updated with the next fingerprint.

Figure 5A:
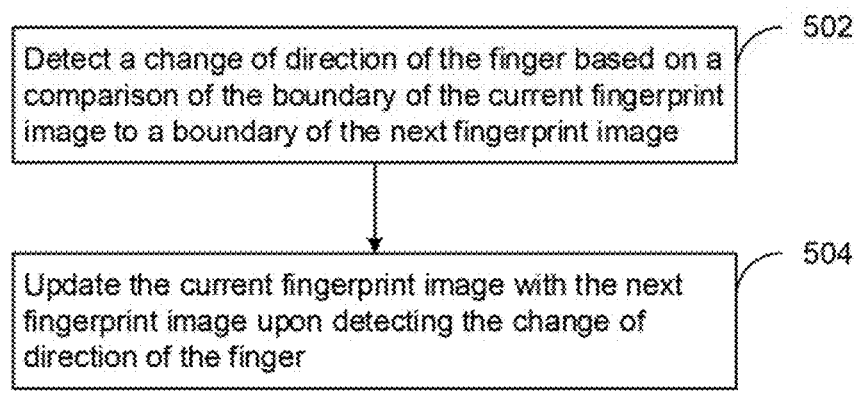
FIG. 5A illustrates an exemplary implementation of detecting a change of direction of a rolling finger according to aspects of the present disclosure.

FIG. 5A illustrates an exemplary implementation of detecting a change of direction of a rolling finger according to aspects of the present disclosure. As shown in FIG. 5A, in block 502, the method detects a change of direction of the finger based on a comparison of the boundary of a current fingerprint image to a boundary of a next fingerprint image. In block 504, the method updates the current fingerprint image with the next fingerprint image upon detecting the change of direction of the finger.

Figure 5B:
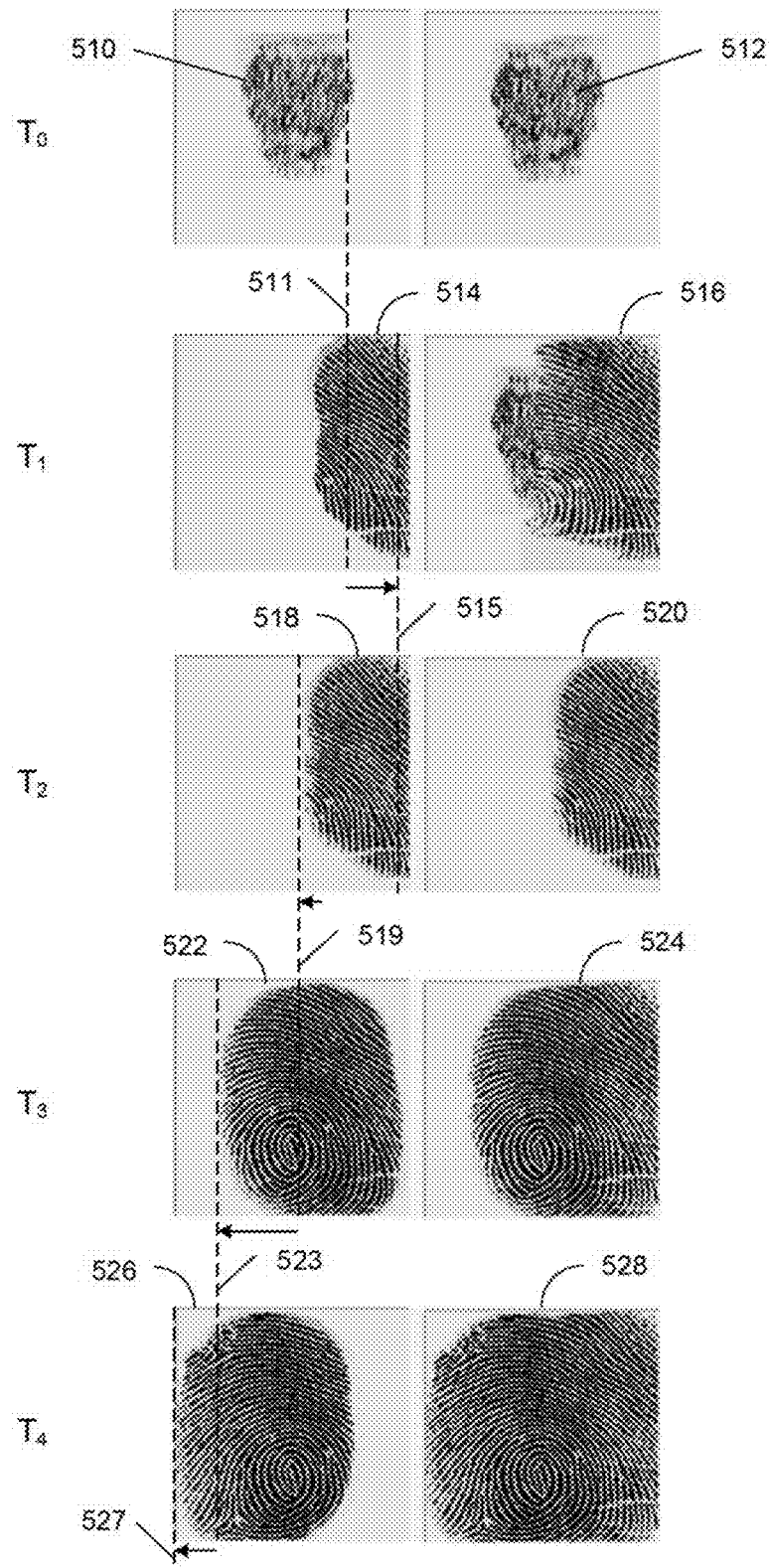
FIG. 5B illustrates an example of enrolling a fingerprint image by rolling a finger first to the right and then to the left on a sensing surface of a fingerprint enrollment apparatus according to aspects of the present disclosure.

FIG. 5B illustrates an example of enrolling a fingerprint image by rolling a finger first to the right and then to the left on a sensing surface of a fingerprint enrollment apparatus according to aspects of the present disclosure. In the example shown in FIG. 5B, at time $T_0$, a user's finger touches the sensing surface of the fingerprint enrollment apparatus. A current fingerprint image 510 of the user's finger at $T_0$ is captured by an image sensor. The right leading edge of the current fingerprint image at time $T_0$ is marked by the dotted line 511. Prior to rolling the finger, there is no next fingerprint image captured by the image sensor. The stitched fingerprint image 512 at $T_0$ is the same as the current fingerprint image 510. The method of stitching the current fingerprint image and a next fingerprint image is described below in association with FIG. 6A through FIG. 6F.

At time $T_1$ as the finger rolls from left to right, the stitched fingerprint image from time $T_0$ becomes the current fingerprint image at $T_1$. The next fingerprint image 514 of the user's finger at $T_1$ is captured by the image sensor. The left leading edge of the next fingerprint image at $T_1$ is marked by the dotted line 515. The stitched fingerprint image 516 at $T_1$ is a combination of the current fingerprint image at $T_1$ (which is the previously stitched fingerprint image 512 at $T_0$) and the next fingerprint image 514 captured at $T_1$.

At time $T_2$ as the finger changes direction and rolls from right to left. The next fingerprint image 518 of the user's finger at $T_2$ is captured by the image sensor. The left leading edge of the next fingerprint image 518 at $T_2$ is marked by the dotted line 519. In one implementation, upon detecting a change of direction of the rolling finger, the controller may ignore the previously stitched fingerprint image (i.e. 516 at $T_1$ in this case) and starts a new sequence of stitched fingerprint images. At $T_2$, the stitched fingerprint image 520 at $T_2$ is a combination of the current fingerprint image at $T_2$ (which is ignored because of the change of direction of the rolled finger) and the next fingerprint image 518 captured at $T_2$.

In some implementations, upon detecting a change of direction of the rolling finger, the controller may keep the previously stitched fingerprint image (i.e. 516 at $T_1$ in this case). At $T_2$, the stitched fingerprint image 520 may be a combination of the current fingerprint image at $T_2$ (which is the previously stitched fingerprint image 516 at $T_1$) and the next fingerprint image 518 captured at $T_2$.

At time $T_3$ as the finger continues to roll from right to left, the stitched fingerprint image from time $T_2$ (520) becomes the current fingerprint image at $T_3$. The next fingerprint image 522 of the user's finger at $T_3$ is captured by the image sensor. The left leading edge of the next fingerprint image 522 at $T_3$ is marked by the dotted line 523. The stitched fingerprint image 524 at $T_3$ is a combination of the current fingerprint image at $T_3$ (which is the previously stitched fingerprint image 520 at $T_2$) and the next fingerprint image 522 captured at $T_3$.

At time $T_4$ as the finger continues to roll from right to left, the stitched fingerprint image from time $T_3$ (524) becomes the current fingerprint image at $T_4$. The next fingerprint image 526 of the user's finger at $T_4$ is captured by the image sensor. The left leading edge of the next fingerprint image 526 at $T_4$ is marked by the dotted line 527. The stitched fingerprint image 528 at $T_4$ is a combination of the current fingerprint image at $T_4$ (which is the previously stitched fingerprint image 524 at $T_3$) and the next fingerprint image 526 captured at $T_4$.

According to aspects of the present disclosure, after a stitched fingerprint image is formed, a controller determines whether the stitched fingerprint image meets a set of fingerprint enrollment criteria. If the set of fingerprint enrollment criteria is met, the controller terminates capturing and processing additional fingerprint images, and the stitched fingerprint image is stored in a memory. If the set of fingerprint enrollment criteria is not met, the controller continues to capture and process additional fingerprint images as the finger rolls across the scan surface of the enrollment apparatus.

Figure 5C:
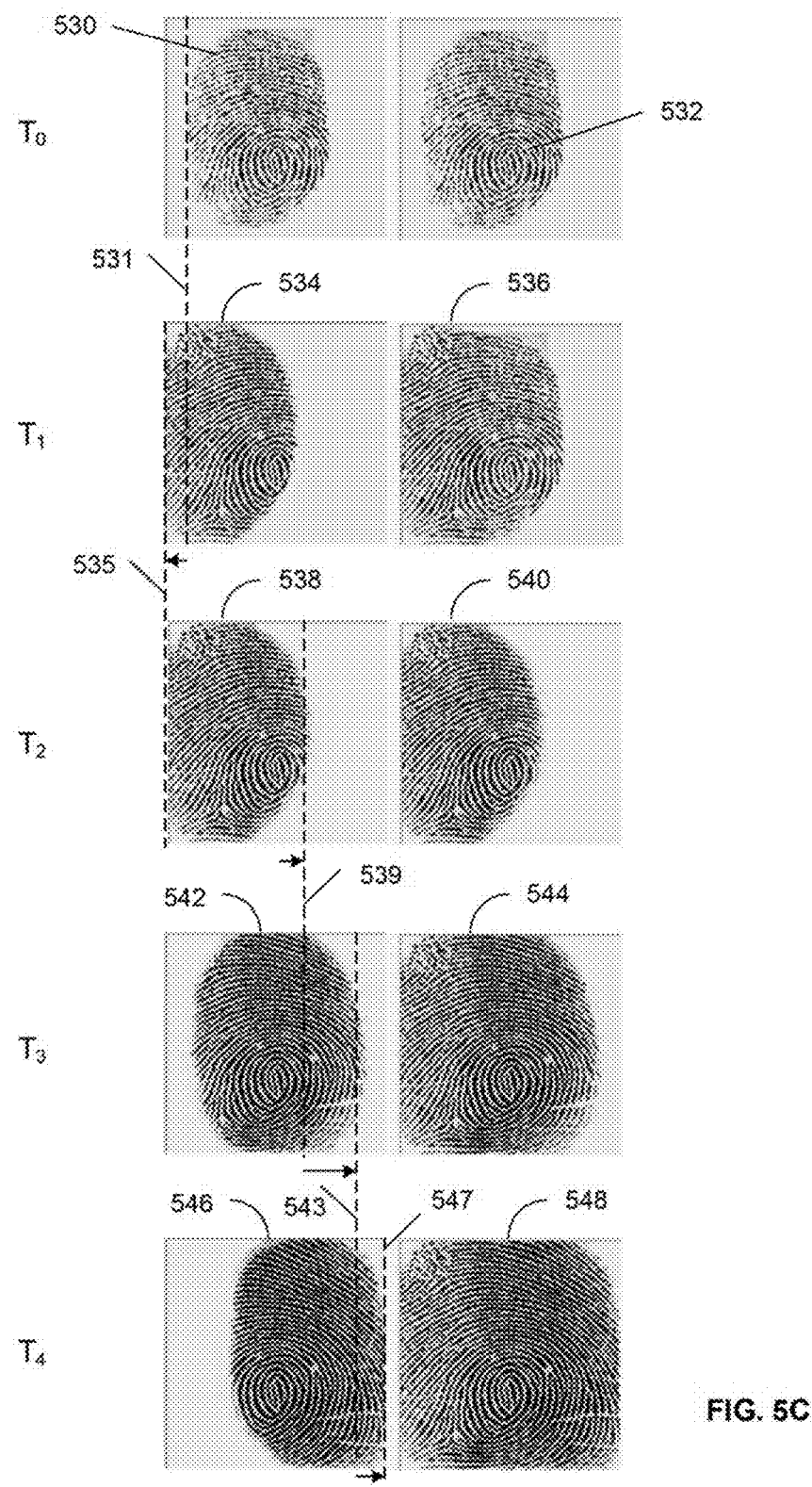
FIG. 5C illustrates an example of enrolling a fingerprint image by rolling a finger first to the left and then to the right on a sensing surface of a fingerprint enrollment apparatus according to aspects of the present disclosure.

FIG. 5C illustrates an example of enrolling a fingerprint image by rolling a finger first to the left and then to the right on a sensing surface of a fingerprint enrollment apparatus according to aspects of the present disclosure. As shown in FIG. 5C, at time $T_0$, a user's finger touches the sensing surface of the fingerprint enrollment apparatus. A current fingerprint image 530 of the user's finger at $T_0$ is captured by an image sensor. The left leading edge of the current fingerprint image at time $T_0$ is marked by the dotted line 531. Prior to rolling the finger, there is no next fingerprint image captured by the image sensor. The stitched fingerprint image 532 at $T_0$ is the same as the current fingerprint image 530. The method of stitching the current fingerprint image and a next fingerprint image is described below in association with FIG. 6A through FIG. 6F.

At time $T_1$ as the finger rolls from right to left, the stitched fingerprint image from time $T_0$ becomes the current fingerprint image at $T_1$. The next fingerprint image 534 of the user's finger at $T_1$ is captured by the image sensor. The left leading edge of the next fingerprint image at $T_1$ is marked by the dotted line 535. The stitched fingerprint image 536 at $T_1$ is a combination of the current fingerprint image at $T_1$ (which is the previously stitched fingerprint image 532 at $T_0$) and the next fingerprint image 534 captured at $T_1$.

At time $T_2$ as the finger changes direction and rolls from left to right. The next fingerprint image 538 of the user's finger at $T_2$ is captured by the image sensor. The right leading edge of the next fingerprint image 538 at $T_2$ is marked by the dotted line 539. In one implementation, upon detecting a change of direction of the rolling finger, the controller may ignore the previously stitched fingerprint image (i.e. 536 at $T_1$ in this case) and starts a new sequence of stitched fingerprint images. At $T_2$, the stitched fingerprint image 540 at $T_2$ is a combination of the current fingerprint image at $T_2$ (which is ignored because of the change of direction of the rolled finger) and the next fingerprint image 538 captured at $T_2$.

At time $T_3$ as the finger continues to roll from left to right, the stitched fingerprint image from time $T_2$ (540) becomes the current fingerprint image at $T_3$. The next fingerprint image 542 of the user's finger at $T_3$ is captured by the image sensor. The right leading edge of the next fingerprint image 542 at $T_3$ is marked by the dotted line 543. The stitched fingerprint image 544 at $T_3$ is a combination of the current fingerprint image at $T_3$ (which is the previously stitched fingerprint image 540 at $T_2$) and the next fingerprint image 542 captured at $T_3$.

At time $T_4$ as the finger continues to roll from left to right, the stitched fingerprint image from time $T_3$ (544) becomes the current fingerprint image at $T_4$. The next fingerprint image 546 of the user's finger at $T_4$ is captured by the image sensor. The right leading edge of the next fingerprint image 546 at $T_4$ is marked by the dotted line 547. The stitched fingerprint image 548 at $T_4$ is a combination of the current fingerprint image at $T_4$ (which is the previously stitched fingerprint image 544 at $T_3$) and the next fingerprint image 546 captured at $T_4$.

Figure 6A:
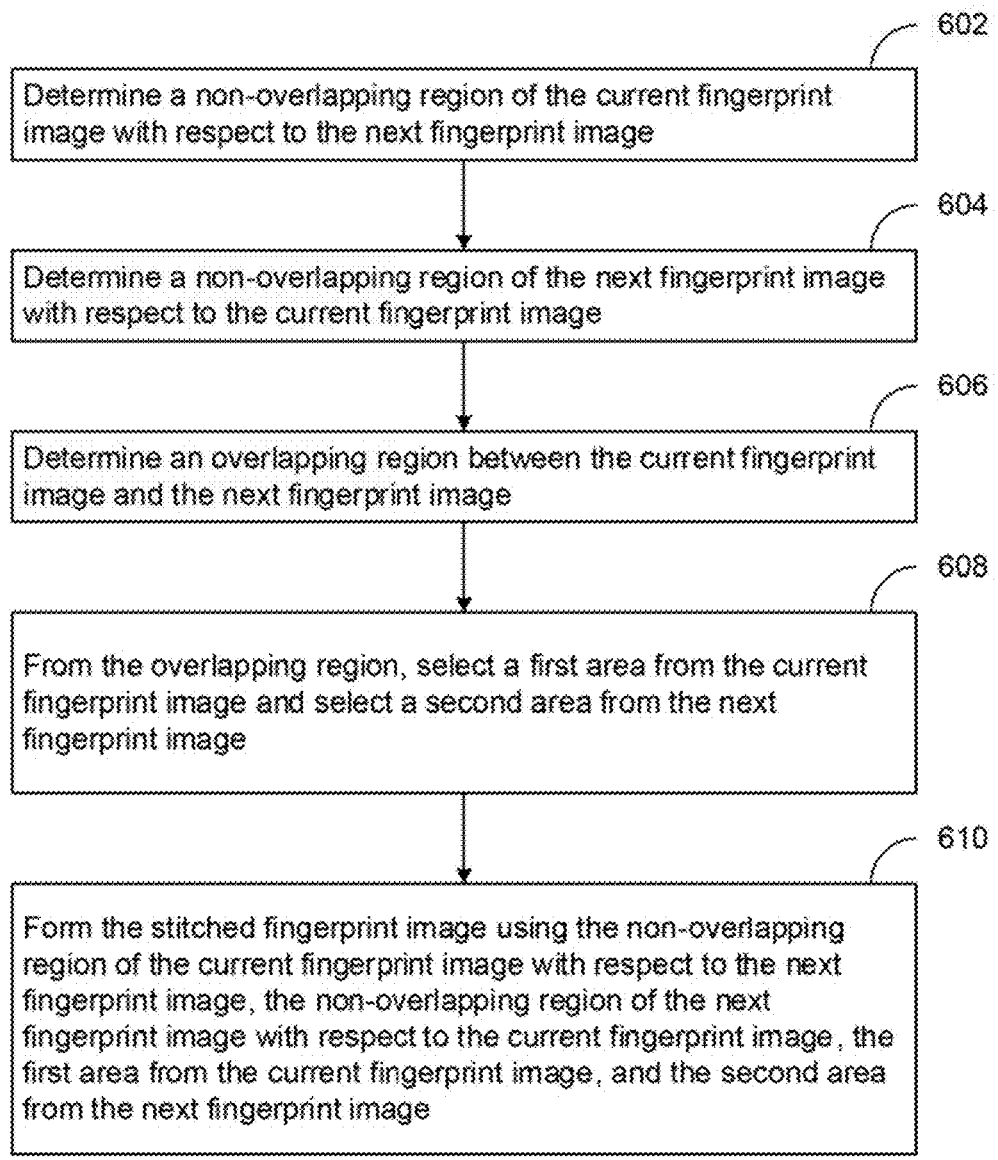
FIG. 6A illustrates a method of stitching a next fingerprint image to a current fingerprint image according to aspects of the present disclosure.

FIG. 6A illustrates a method of stitching a next fingerprint image to a current fingerprint image according to aspects of the present disclosure. In the example shown in FIG. 6A, in block 602, the method determines a non-overlapping region of the current fingerprint image with respect to the next fingerprint image. In block 604, the method determines a non-overlapping region of the next fingerprint image with respect to the current fingerprint image. In block 606, the method determining an overlapping region between the current fingerprint image and the next fingerprint image. In block 608, the method selects a first area from the current fingerprint image and selects a second area from the next fingerprint image from the overlapping region. In block 610, the method forms the stitched fingerprint image using the non-overlapping region of the current fingerprint image with respect to the next fingerprint image, the non-overlapping region of the next fingerprint image with respect to the current fingerprint image, the first area from the current fingerprint image, and the second area from the next fingerprint image.

Figure 6B:
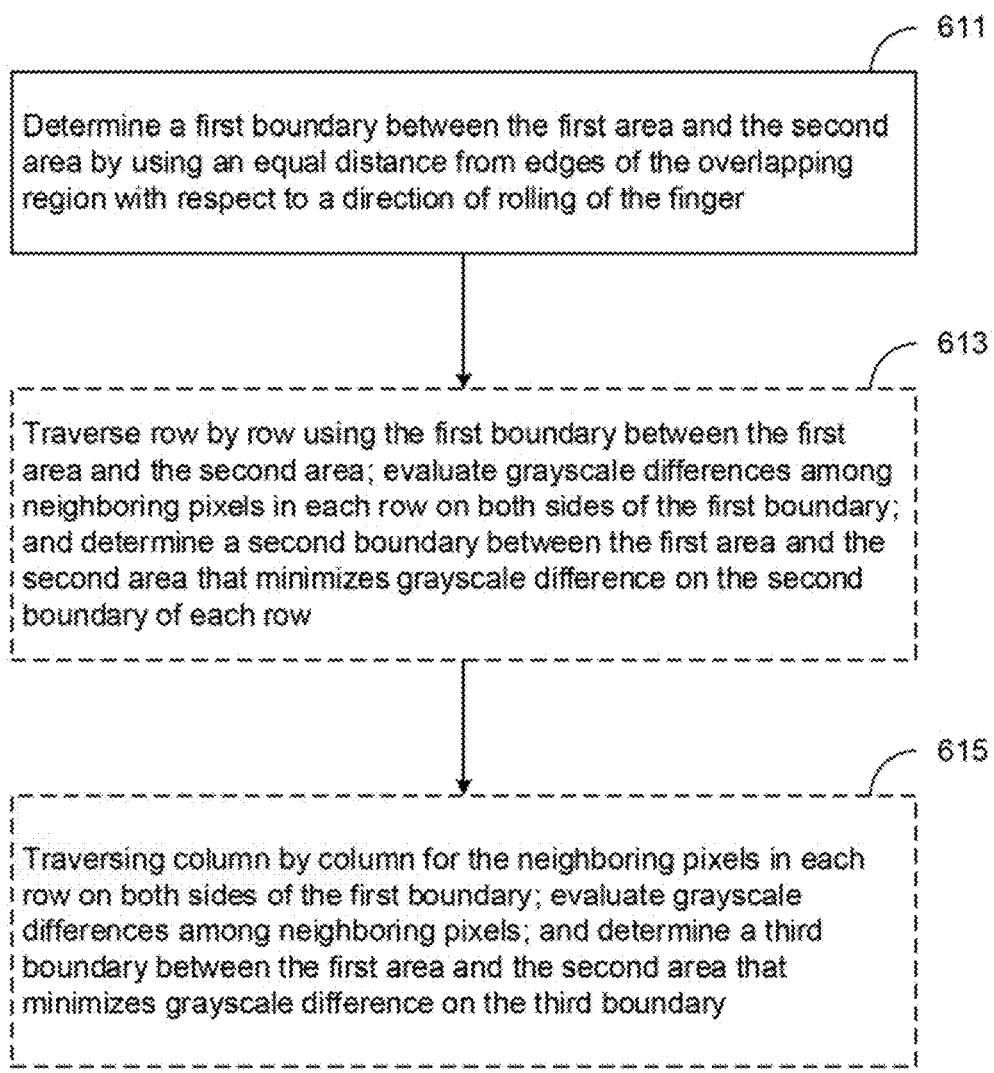
FIG. 6B illustrates exemplary implementations of selecting a first area from the current fingerprint image and selecting a second area from the next fingerprint image in the overlapping region of FIG. 6A according to aspects of the present disclosure.

FIG. 6B illustrates exemplary implementations of selecting a first area from the current fingerprint image and selecting a second area from the next fingerprint image in the overlapping region of FIG. 6A according to aspects of the present disclosure. In the exemplary approaches shown in FIG. 6B, in block 611, the method determines a first boundary between the first area and the second area by using an equal distance from edges of the overlapping region with respect to a direction of rolling of the finger. In some implementations, the methods described in block 611 may additionally or optionally include the methods described in block 613.

In block 613, the method traverses row by row using the first boundary between the first area and the second area, evaluates grayscale differences among neighboring pixels in each row on both sides of the first boundary, and determine a second boundary between the first area and the second area that minimizes grayscale difference on the second boundary of each row. In some implementations, the methods described in block 613 may additionally or optionally include the methods described in block 615.

In block 615, the method traverses column by column for the neighboring pixels in each row on both sides of the first boundary, evaluates grayscale differences among neighboring pixels, and determines a third boundary between the first area and the second area that minimizes grayscale difference on the third boundary.

Figure 6C:
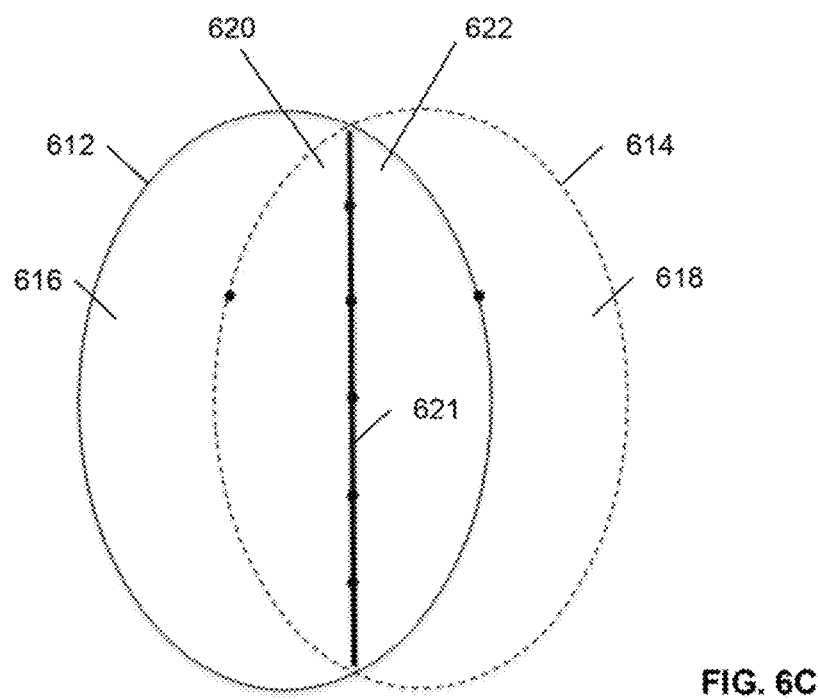
FIG. 6C illustrates an exemplary implementation of stitching a next fingerprint image to a current fingerprint image according to aspects of the present disclosure.

FIG. 6C illustrates an exemplary implementation of stitching a next fingerprint image to a current fingerprint image according to aspects of the present disclosure. As shown in FIG. 6C, the oval on the left represents a current fingerprint image 612 and the dotted oval on the right represents a next fingerprint image 614. A controller determines a non-overlapping region of the current fingerprint image 616 with respect to the next fingerprint image 614, a non-overlapping region of the next fingerprint image 618 with respect to the current fingerprint image, and an overlapping region between the current fingerprint image and the next fingerprint image. The controller selects a first area 620 from the current fingerprint image 612 and selects a second area 622 from the next fingerprint image 614 from the overlapping region. The boundary 621 between the first area and the second area of the overlapped region is determined according to the methods described in association with FIG. 6B. In particular, the boundary 621 between the first area and the second area is determined by using an equal distance from edges of the overlapping region with respect to a direction of rolling of the finger. The controller forms the stitched fingerprint image using the non-overlapping region of the current fingerprint image 616 with respect to the next fingerprint image, the non-overlapping region of the next fingerprint image 618 with respect to the current fingerprint image, the first area from the current fingerprint image 620, and the second area from the next fingerprint image 622.

Figure 6D:
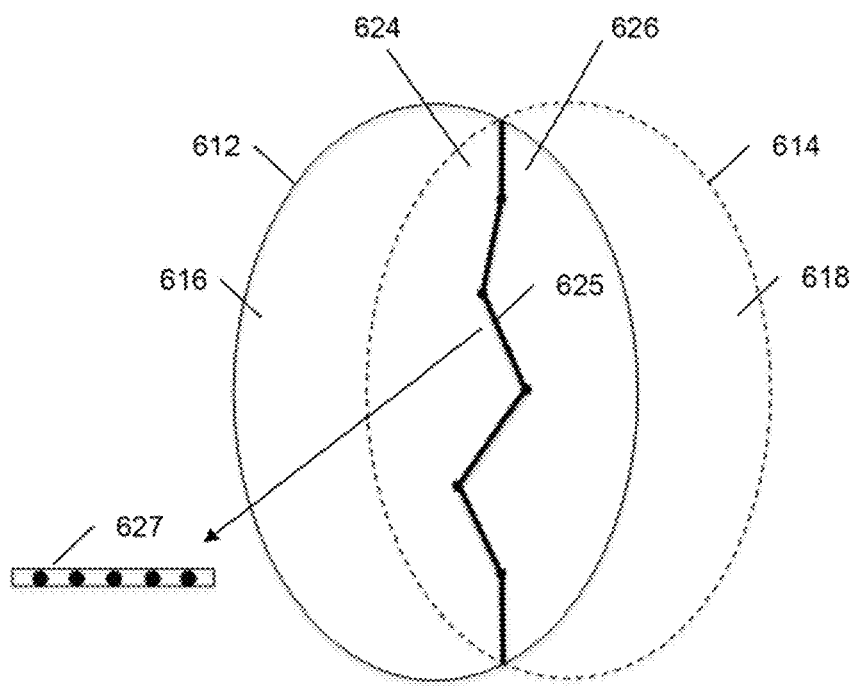
FIG. 6D illustrates another exemplary implementation of stitching a next fingerprint image to a current fingerprint image according to aspects of the present disclosure.

FIG. 6D illustrates another exemplary implementation of stitching a next fingerprint image to a current fingerprint image according to aspects of the present disclosure. Similar to FIG. 6C, the oval on the left represents a current fingerprint image 612 and the dotted oval on the right represents a next fingerprint image 614. A controller determines a non-overlapping region of the current fingerprint image 616 with respect to the next fingerprint image 614, a non-overlapping region of the next fingerprint image 618 with respect to the current fingerprint image, and an overlapping region between the current fingerprint image and the next fingerprint image. The controller selects a first area 624 from the current fingerprint image 612 and selects a second area 626 from the next fingerprint image 614 from the overlapping region. The boundary 625 between the first area and the second area of the overlapped region is determined according to the methods described in association with FIG. 6B. In particular, the boundary 625 between the first area and the second area is determined by traversing row by row using the boundary 621 (in FIG. 6C) between the first area and the second area, evaluating grayscale differences among neighboring pixels in each row on both sides of the first boundary as shown in diagram 627, and determining the boundary 625 between the first area and the second area that minimizes grayscale differences on the first and second boundary of each row (in another words, on the each row of the near current and the next fingerprint boundary area). The controller forms the stitched fingerprint image using the non-overlapping region of the current fingerprint image 616 with respect to the next fingerprint image, the non-overlapping region of the next fingerprint image 618 with respect to the current fingerprint image, the first area from the current fingerprint image 624, and the second area from the next fingerprint image 626.

Figure 6E:
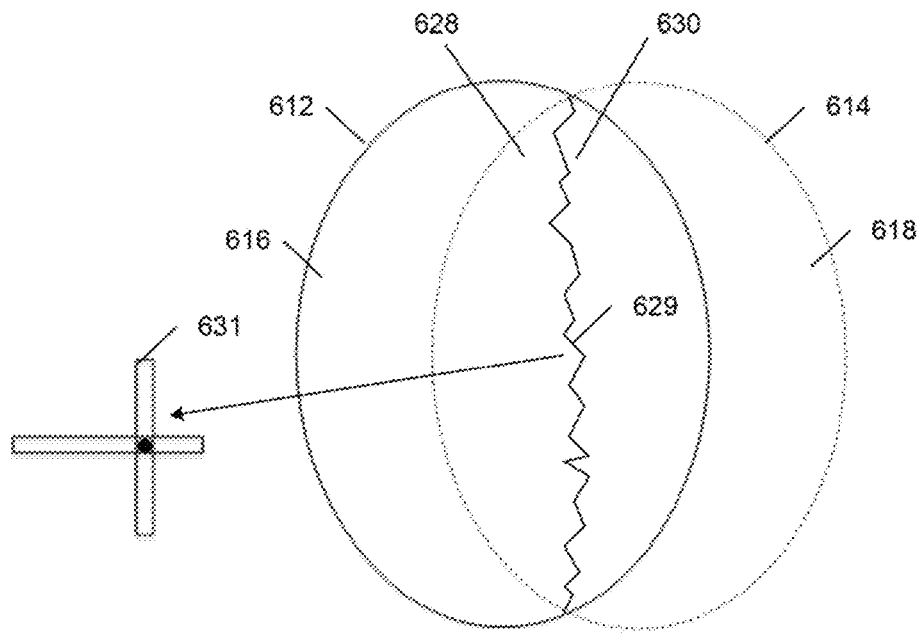
FIG. 6E illustrates yet another exemplary implementation of stitching a next fingerprint image to a current fingerprint image according to aspects of the present disclosure.

FIG. 6E illustrates yet another exemplary implementation of stitching a next fingerprint image to a current fingerprint image according to aspects of the present disclosure. Similar to FIG. 6C, the oval on the left represents a current fingerprint image 612 and the dotted oval on the right represents a next fingerprint image 614. A controller determines a non-overlapping region of the current fingerprint image 616 with respect to the next fingerprint image 614, a non-overlapping region of the next fingerprint image 618 with respect to the current fingerprint image, and an overlapping region between the current fingerprint image and the next fingerprint image. The controller selects a first area 628 from the current fingerprint image 612 and selects a second area 630 from the next fingerprint image 614 from the overlapping region. In particular, the boundary 629 between the first area and the second area is determined by traversing row by row using the boundary 625 (in FIG. 6D) between the first area and the second area, traversing column by column, represented by diagram 631, for the neighboring pixels in each row on both sides of boundary 625, evaluating grayscale differences among neighboring pixels, and determining boundary 629 between the first area and the second area that minimizes grayscale difference on the boundary 629. The controller forms the stitched fingerprint image using the non-overlapping region of the current fingerprint image 616 with respect to the next fingerprint image, the non-overlapping region of the next fingerprint image 618 with respect to the current fingerprint image, the first area from the current fingerprint image 628, and the second area from the next fingerprint image 630.

Figure 6F:
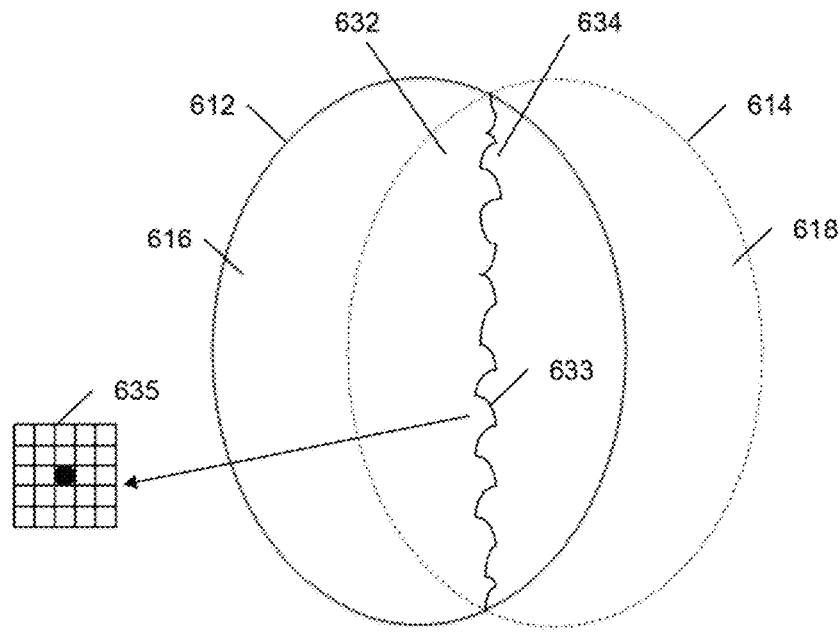
FIG. 6F illustrates yet another exemplary implementation of stitching a next fingerprint image to a current fingerprint image according to aspects of the present disclosure.

FIG. 6F illustrates yet another exemplary implementation of stitching a next fingerprint image to a current fingerprint image according to aspects of the present disclosure. Similar to FIG. 6C, the oval on the left represents a current fingerprint image 612 and the dotted oval on the right represents a next fingerprint image 614. A controller determines a non-overlapping region of the current fingerprint image 616 with respect to the next fingerprint image 614, a non-overlapping region of the next fingerprint image 618 with respect to the current fingerprint image, and an overlapping region between the current fingerprint image and the next fingerprint image. The controller selects a first area 632 from the current fingerprint image 612 and selects a second area 634 from the next fingerprint image 614 from the overlapping region. Note that this particular implementation is similar to that of FIG. 6E. For each pixel in a row near the boundary 631, instead of examining for the pixels above and below, the implementation takes into consideration all surrounding pixels in its evaluation of grayscale differences as shown in diagram 635. The controller forms the stitched fingerprint image using the non-overlapping region of the current fingerprint image 616 with respect to the next fingerprint image, the non-overlapping region of the next fingerprint image 618 with respect to the current fingerprint image, the first area from the current fingerprint image 628, and the second area from the next fingerprint image 630.

Figure 7A:
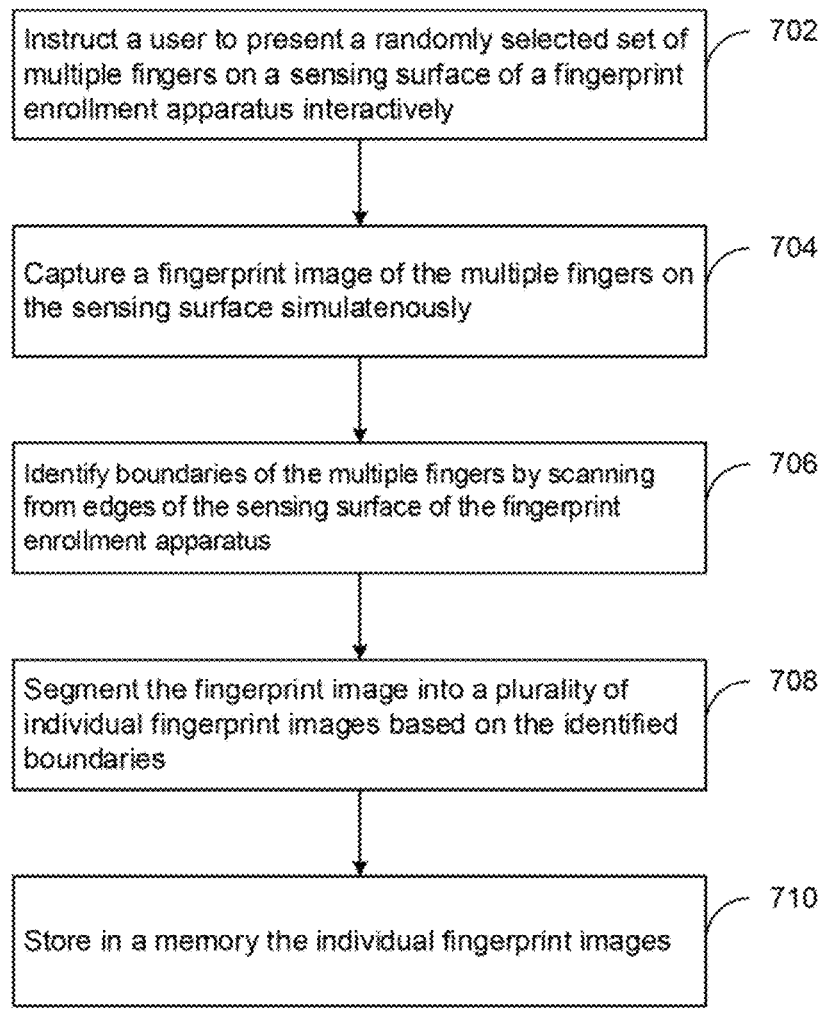
FIG. 7A illustrates an exemplary implementation for simultaneous interactive multiple fingerprint enrollment according to aspects of the present disclosure.

FIG. 7A illustrates an exemplary implementation for simultaneous interactive multiple fingerprint enrollments according to aspects of the present disclosure. As shown in the example of FIG. 7A, in block 702, the method instructs a user to present a randomly selected set of multiple fingers on a sensing surface of a fingerprint enrollment apparatus interactively. In block 704, the method captures a fingerprint image of the multiple fingers on the sensing surface simultaneously. In block 706, the method identifies boundaries of the multiple fingers by scanning from edges of the sensing surface of the fingerprint enrollment apparatus. In block 708, the method segments the fingerprint image into a plurality of individual fingerprint images based on the identified boundaries. In block 710, the method stores in a memory the individual fingerprint images.

Figure 7B:
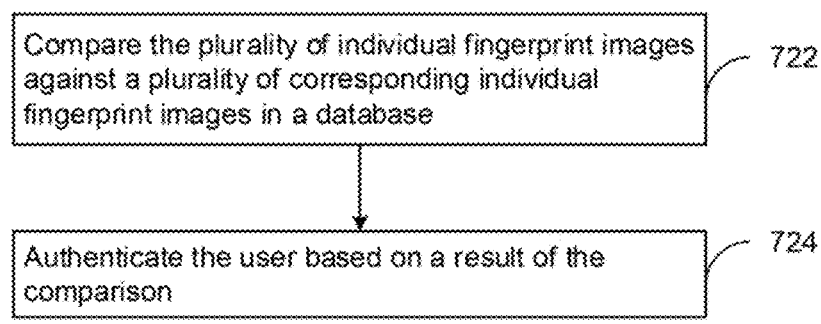
FIG. 7B illustrates an exemplary implementation for authenticating a user by comparing fingerprint images according to aspects of the present disclosure.

In some implementations, the method performed in FIG. 7A may further include the method performed in FIG. 7B. FIG. 7B illustrates an exemplary implementation for authenticating a user by comparing fingerprint images according to aspects of the present disclosure. As shown in FIG. 7B, in block 722, the method compares the plurality of individual fingerprint images against a plurality of corresponding individual fingerprint images in a database. In block 724, the method authenticates the user based on a result of the comparison.

According to aspects of the present disclosure, the randomly selected set of fingers may include: 1) a finger from a left hand and a finger from a right hand; 2) a finger from the left hand and two fingers from the right hand; 3) a finger from the right hand and two fingers from the left hand; or 4) multiple fingers from the left hand and multiple fingers from the right hand.

Figure 8A:
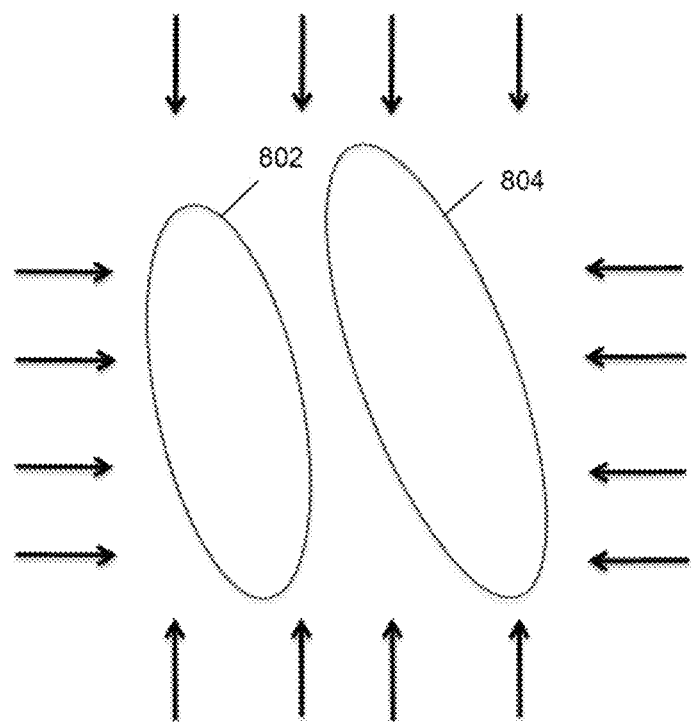
FIG. 8A illustrates an exemplary implementation for capturing a fingerprint image of the multiple fingers on the sensing surface simultaneously according to aspects of the present disclosure.

FIG. 8A illustrates an exemplary implementation for capturing a fingerprint image of the multiple fingers on the sensing surface simultaneously according to aspects of the present disclosure. As shown in FIG. 8A, the method scans towards the randomly selected set of fingers 802 and 804 to detect a boundary of the fingerprint image from each edge of the sensing surface of the fingerprint authentication apparatus, as represented by the arrows. In some implementations, the scanning process may be performed sequentially in one direction at a time. In some other implementations, the scanning process may be performed in parallel in more than one direction. The method captures the fingerprint image within the boundary.

Figure 8B:
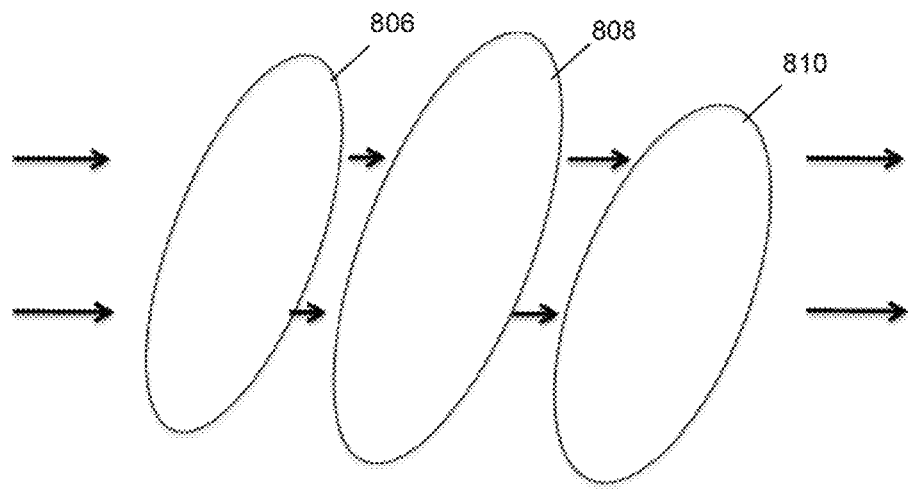
FIG. 8B illustrates another exemplary implementation for capturing a fingerprint image of the multiple fingers on the sensing surface simultaneously according to aspects of the present disclosure.

FIG. 8B illustrates another exemplary implementation for capturing a fingerprint image of the multiple fingers on the sensing surface simultaneously according to aspects of the present disclosure. In the example of FIG. 8B, the method scans towards the randomly selected set of fingers 806, 808 and 810 to detect a boundary of the fingerprint image from the left edge of the sensing surface of the fingerprint authentication apparatus, as represented by the arrows. The method may scan past each finger until it reaches the right edge of the sensing surface of the fingerprint authentication. The scanning process may be repeated in other directions (not shown). The results of the scanning in different directions may be combined to enhance the detected boundaries of the fingerprint image.

Figure 8C:
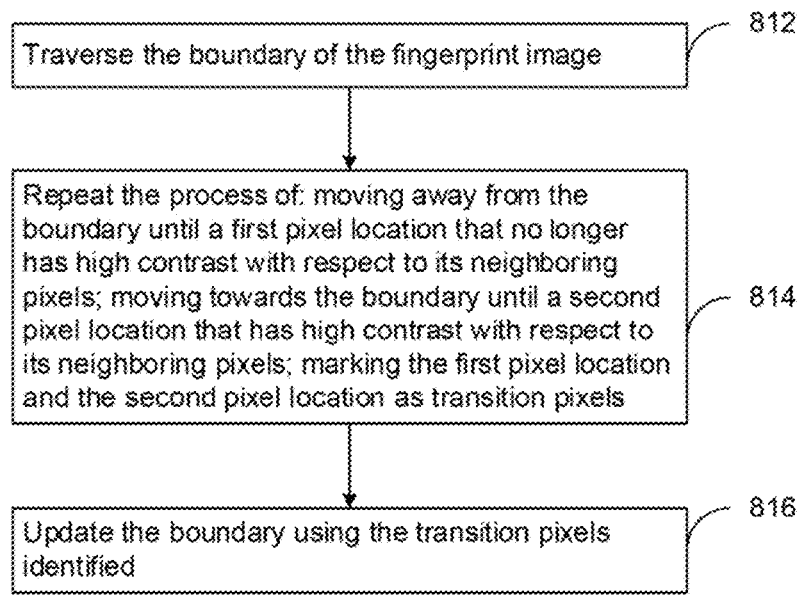
FIG. 8C illustrates an exemplary implementation for tracing the boundary of a fingerprint image according to aspects of the present disclosure.

FIG. 8C illustrates an exemplary implementation for tracing the boundary of a fingerprint image according to aspects of the present disclosure. In the example of FIG. 8C, in block 812, the method traverses the boundary of the fingerprint image. In block 814, the method repeats the process of moving away from the boundary until a first pixel location that no longer has high contrast with respect to its neighboring pixels, moving towards the boundary until a second pixel location that has high contrast with respect to its neighboring pixels, and marking the first pixel location and the second pixel location as transition pixels. In block 816, the method updates the boundary using the transition pixels identified.

Figure 8D:
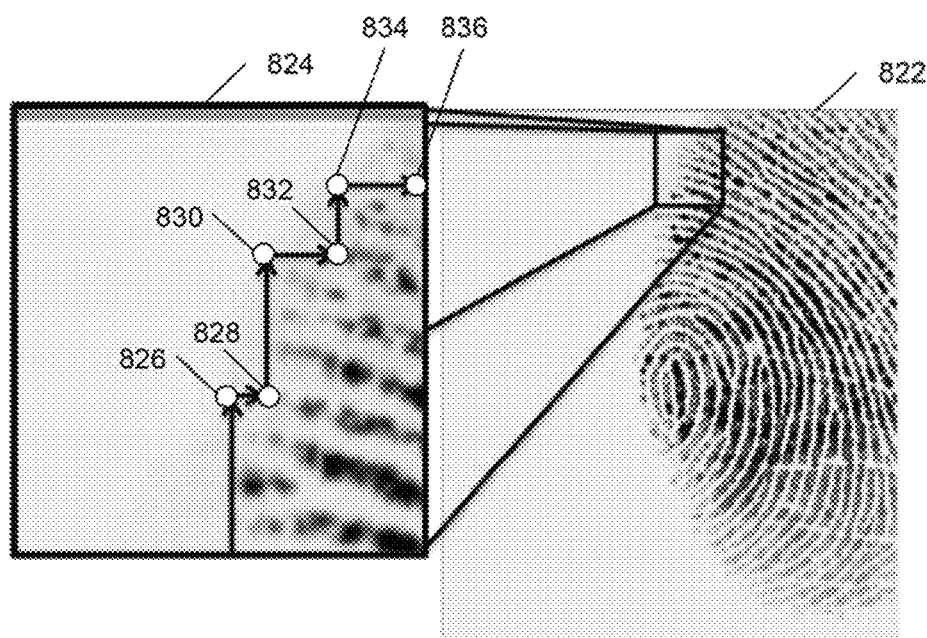
FIG. 8D illustrates a graphical representation of tracing the boundary of a fingerprint image according to aspects of the present disclosure.

FIG. 8D illustrates a graphical representation of tracing the boundary of a fingerprint image according to aspects of the present disclosure. As shown in FIG. 8D, for illustration purposes, a fingerprint image 822 is shown on the right hand side. An enlarged portion 824 of the fingerprint image 822 is shown on the left hand side. The method traverses the boundary of the fingerprint image, as represented by the arrows. In one implementation, the method repeats the process of: 1) move away from the boundary until the first pixel location 826 that no longer has high contrast with respect to its neighboring pixels; 2) move towards the boundary until a second pixel location 828 that has high contrast with respect to its neighboring pixels, and marking the first pixel location 826 and the second pixel location 828 as transition pixels. The process may be repeated to identify other transition pixels, such as 830, 832, 834, 836, etc. The method updates the boundary using the transition pixels identified.

Figure 9A:
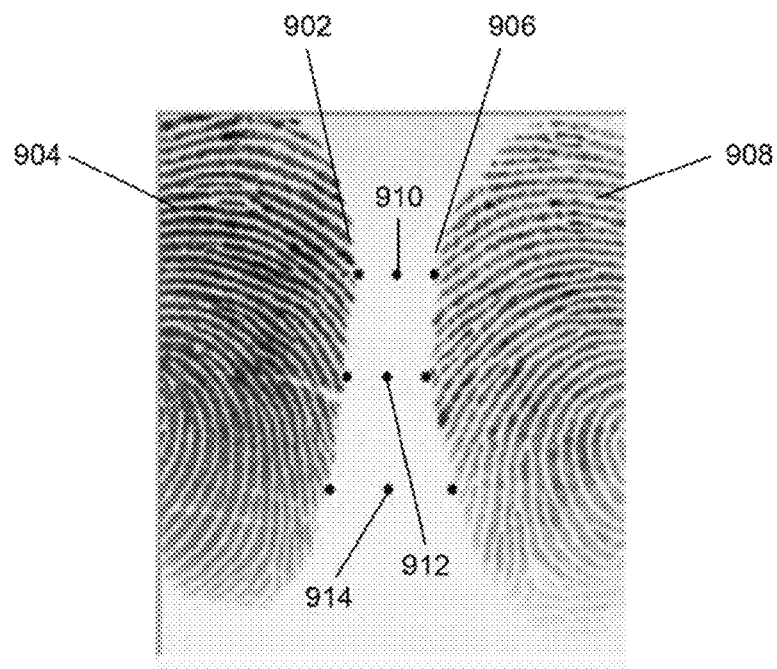
FIGS. 9A-9B illustrate an exemplary implementation of segmenting the fingerprint image into a plurality of individual fingerprint images according to aspects of the present disclosure.
Figure 9B:
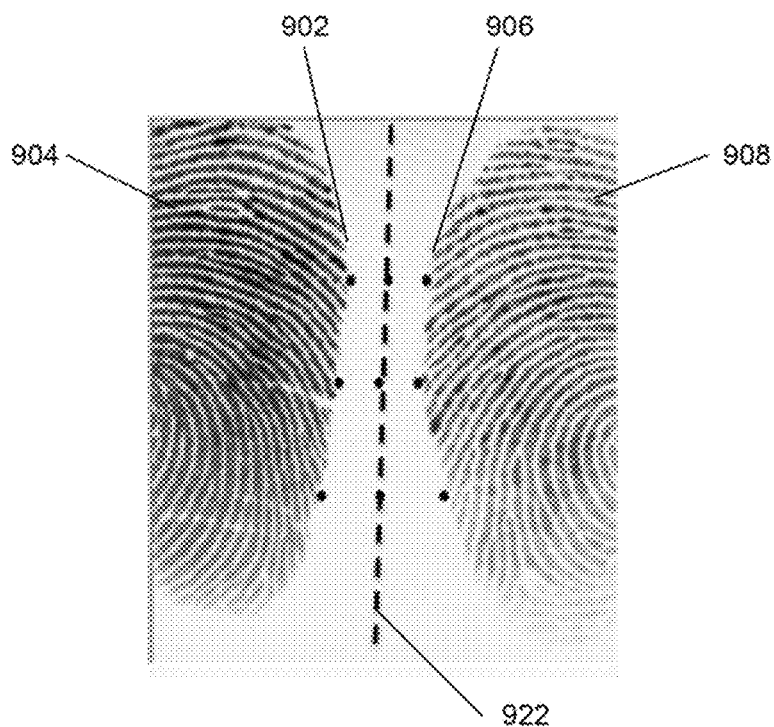

FIGS. 9A-9B illustrate an exemplary implementation of segmenting the fingerprint image into a plurality of individual fingerprint images according to aspects of the present disclosure. As shown in FIG. 9A, the method identifies a first boundary 902 of a first finger 904 and a second boundary 906 of a second finger 908. The method determines a plurality of points, such as points 910, 912, and 914, where each point has substantially equal distance from the first boundary 902 of the first finger and the second boundary 906 of the second finger. The method generates a line 922 that represents a fit to the plurality of points, as shown in FIG. 9B. In the example shown in FIG. 9B, the line 922 may be linear in the form of y=ax+b. In some other implementations, the line may be in the form of second order such as $y=ax^2+bx+c$, or in the form of higher order, depending on the shape and arrangement of the fingers. Upon generating the line 922, the method separates the first finger 904 and the second finger 908 in the fingerprint image using the line 922.

In some implementations, upon segmenting the fingerprint image into a plurality of individual fingerprint images, each of the individual fingerprint images may be rotated for correction using the information derived from the line, such as line 922, which segments the multiple fingers. In the example of FIG. 9B, the slope of the linear equation y=ax+b may be used as the angle of rotation for the segmented individual fingerprint images. By rotating the individual fingerprint images to correct the position, the amount of time required to compare a fingerprint image to a stored fingerprint image in a subsequent authentication of a user may be reduced.

Figure 9C:
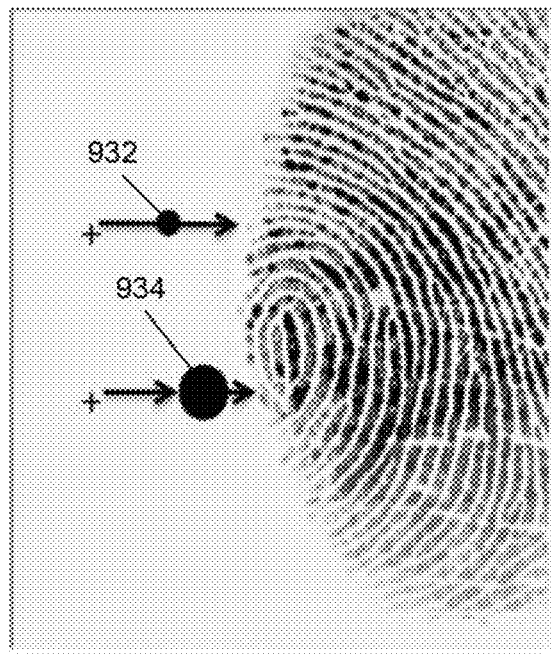
FIG. 9C illustrates an exemplary implementation of removing noise in scanning a fingerprint image according to aspects of the present disclosure.

FIG. 9C illustrates an exemplary implementation of removing noise in scanning a fingerprint image according to aspects of the present disclosure. In the example of FIG. 9C, the method identifies a number of consecutive pixels, such as the pixels represented by circles 932 and 934, that have differences of grayscale values less than a reference number of consecutive pixels. Note that the drawings are not to scale. The method ignores the number of consecutive pixels, such as the pixels represented by circles 932 and 934 that have differences of grayscale values less than a reference number of consecutive pixels as background noise.

Figure 9D:
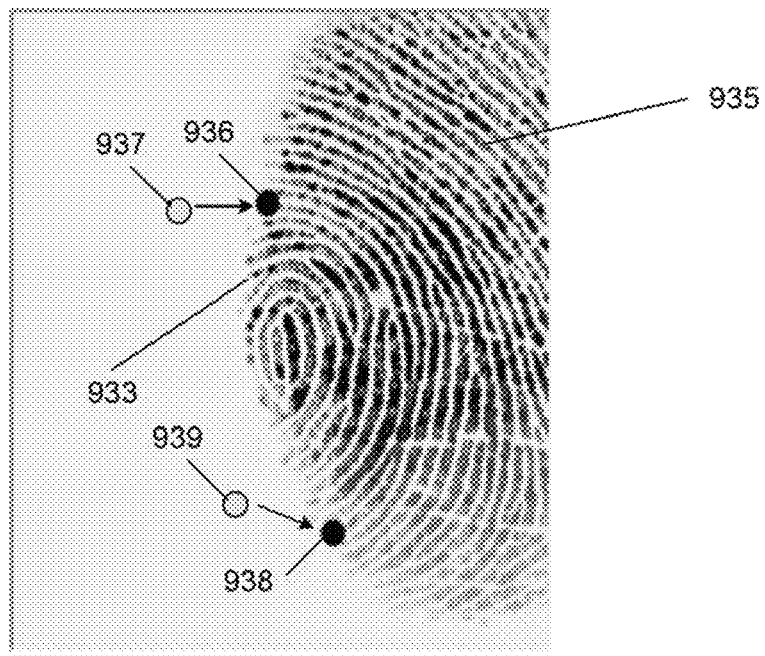
FIG. 9D illustrates an exemplary implementation of removing outliers in scanning a fingerprint image according to aspects of the present disclosure.

FIG. 9D illustrates an exemplary implementation of removing outliers in scanning a fingerprint image according to aspects of the present disclosure. As shown in FIG. 9D, the method traverses a boundary 933 of a fingerprint image 935. The method identifies one or more outlier pixels, such as outlier pixels represented by circles 936 and 938 that are substantially different from their neighboring pixels. The method replaces the outlier pixel, such as outlier pixels represented by circles 936 and 938 with replacement pixels, such as pixels represented by circles 937 and 939, having average value of their neighboring pixels.

According to aspects of the present disclosure, both top emission and bottom emission type OLED structures (FIG. 10A) can be used as a component of a fingerprint acquisition apparatus. Several different types of OLED devices, such as small molecule OLED, polymer OLED, or solution based OLED, may be utilized as the main OLED device structures. Both transparent and non-transparent OLED panels can be used as the main component of a fingerprint acquisition apparatus. (FIG. 10B) Both thin panel and flexible or conformable types of OLED panels can be used as the main component of a fingerprint acquisition apparatus. (FIG. 10C)

An active matrix OLED (AMOLED) panel can be used as the main component of a fingerprint acquisition apparatus. An AMOLED panel may include subpixel areas (red, green, and blue subpixels) and a driving circuit area (thin film transistor and capacitor). The brightness of each subpixel can be adjusted by the driving and switching transistors and capacitors and by controlling the amount of current injected to the OLED subpixels. The dimension of subpixels can be formed using OLED material deposition techniques. For instance, the size and position of subpixels can be set by using shadow masks during the OLED material evaporation process.

An OLED may have a layered structure with the following sequence: anode/hole injection layer/hole transport layer/emissive layer/electron transport layer/electron injection layer/cathode. ITO and other transparent conducting materials having high work function can be used for anode materials, and metals such as aluminum and magnesium can be used for cathode materials. FIG. 10D shows the structure of a bottom emission OLED. In this example, the imaging surface would be at the bottom of the substrate, and the light emission plane would be the cathode layer. The optical structure may include the transparent layers between the substrate and the cathode.

The reliability of such a fingerprint acquisition apparatus, i.e. the OLED panel lifetime, can be improved by using various sealing techniques and materials, such as desiccant, frit glass sealing, and thin film encapsulation. Various types of substrates such as sapphire, glass, and plastic materials can be used for OLED carriers in order to control the light travel path (refractive index control), to enhance/improve signal to noise ratio of image sensing, and to improve the reliability and lifetime of the fingerprint apparatus.

In some embodiments, an AMOLED panel has a three-subpixel structure. In the subpixel structure, for example, a blue subpixel can be used as a light source while the neighboring green or red subpixels may be used as a sensor because the band gap of blue subpixels is larger than that of the green or red subpixels.

The OLED panel resolution can be controlled by varying the size and density of each subpixel and by setting the subpixel structure of the OLED panel. For example, an OLED panel may have a larger lighting component (e.g. blue subpixels) and a smaller sensor component (e.g. green and/or red subpixels). According to aspects of the present disclosure, subpixel structures can have different sizes. The subpixel density can be enhanced by changing pixel shape from stripe type to circular or diamond shape. In addition, an OLED subpixel structure can have different shapes, such as square, rectangle, circle, diamond, etc. The patterning of the subpixel structure can be fabricated by using fine metal mask processes, ink-jet printing, or laser transfer technologies.

To improve the performance of, among other things, detecting boundary information and the stitching of the fingerprint images, a method of accentuating fingerprint features of a fingerprint image is introduced. The process of accentuation may include, additionally and/or optionally, of a series of image processing steps, such as average filter, gray scale normalization and image sharpening, that may enhance image contrast of the captured fingerprint image by amplifying the gray level difference between ridges and valleys of the fingerprint and reducing the gray level distribution of the image background to a near uniform level. The process of accentuation may also have an image normalization effect that can help the overall performance under various capture conditions, including bright light source, dark light source, wet finger, dry finger, etc.

Figure 11:
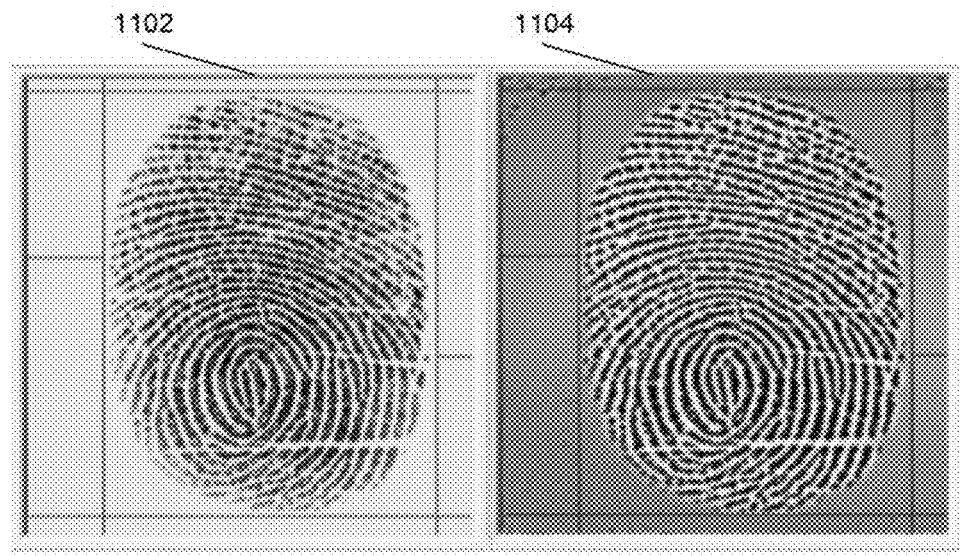
FIG. 11 illustrates an exemplary implementation of accentuating fingerprint features of a fingerprint image according to aspects of the present disclosure.

FIG. 11 illustrates an exemplary implementation of accentuating fingerprint features of a fingerprint image according to aspects of the present disclosure. As shown in FIG. 11, fingerprint image 1102 represents a fingerprint image prior to a fingerprint features accentuation process being applied, and fingerprint image 1104 represents the fingerprint image after the fingerprint features accentuation process being applied. According to aspects of the present disclosure, the fingerprint features accentuation process may include constructing a histogram of tonality values of a current fingerprint image captured, determining differences between the histogram of tonality values of the current fingerprint image to a histogram of tonality values of a reference fingerprint image, and adjusting the brightness of the subsequently captured fingerprint images based on the differences between the histogram of tonality values of the current fingerprint image to a histogram of tonality values of a reference fingerprint image.

The method of adjusting the brightness of the subsequently captured fingerprint images may include adjusting the brightness of the subsequently captured fingerprint images in proportion to the differences between the histogram of tonality values of the current fingerprint image to a histogram of tonality values of a reference fingerprint image, adjusting the brightness of the subsequently captured fingerprint images based on the differences between the histogram of tonality values of the current fingerprint image to a histogram of tonality values of a reference fingerprint image using a lookup table generated from empirical data, or adjusting the brightness of the subsequently captured fingerprint images based on the differences between the histogram of tonality values of the current fingerprint image to a histogram of tonality values of a reference fingerprint image using a function generated from the empirical data.

Upon completion of the fingerprint features accentuation process, the edges of the fingerprint image 1104 are better defined than the edges of the fingerprint image 1102. The ridges of the fingerprint image 1104 are darker than the ridges of the fingerprint image 1102, and the valleys of the fingerprint image 1104 are brighter than the valleys of the fingerprint image 1102. This improvement is beneficial to the detection and enrollment of the fingerprint image.

Figure 12:
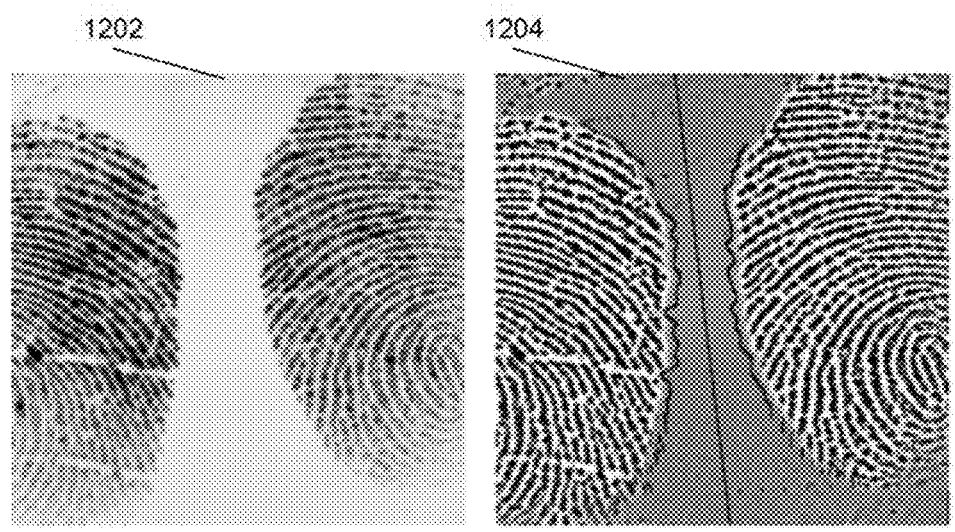
FIG. 12 illustrates an exemplary implementation of accentuating fingerprint features of an image of multiple fingers according to aspects of the present disclosure.

FIG. 12 illustrates an exemplary implementation of accentuating fingerprint features of an image of multiple fingers according to aspects of the present disclosure. As shown in FIG. 12, 1202 represents an image of multiple fingers prior to a fingerprint features accentuation process being applied, and 1204 represents the image of multiple fingers after the fingerprint features accentuation process being applied. According to aspects of the present disclosure, the fingerprint features accentuation process may include constructing a histogram of tonality values of the fingerprint image of multiple fingers, determining differences between the histogram of tonality values of the fingerprint image to a histogram of tonality values of a reference fingerprint image, and adjusting a brightness of the fingerprint image based on the differences between the histogram of tonality values of the fingerprint image to the histogram of tonality values of the reference fingerprint image.

The method of adjusting the brightness of the fingerprint images may include adjusting the brightness of the fingerprint images in proportion to the differences between the histogram of tonality values of the fingerprint image to a histogram of tonality values of a reference fingerprint image, adjusting the brightness of the fingerprint images based on the differences between the histogram of tonality values of the fingerprint image to a histogram of tonality values of a reference fingerprint image using a lookup table generated from empirical data, or adjusting the brightness of the fingerprint images based on the differences between the histogram of tonality values of the fingerprint image to a histogram of tonality values of a reference fingerprint image using a function generated from the empirical data.

Upon completion of the fingerprint features accentuation process, the edges of the fingerprint image 1204 are better defined than the edges of the fingerprint image 1202. The ridges of the fingerprint image 1204 are darker than the ridges of the fingerprint image 1202, and the valleys of the fingerprint image 1204 are brighter than the valleys of the fingerprint image 1202. This improvement is beneficial to simultaneous multiple fingerprint detection and authentication.

Figure 13:
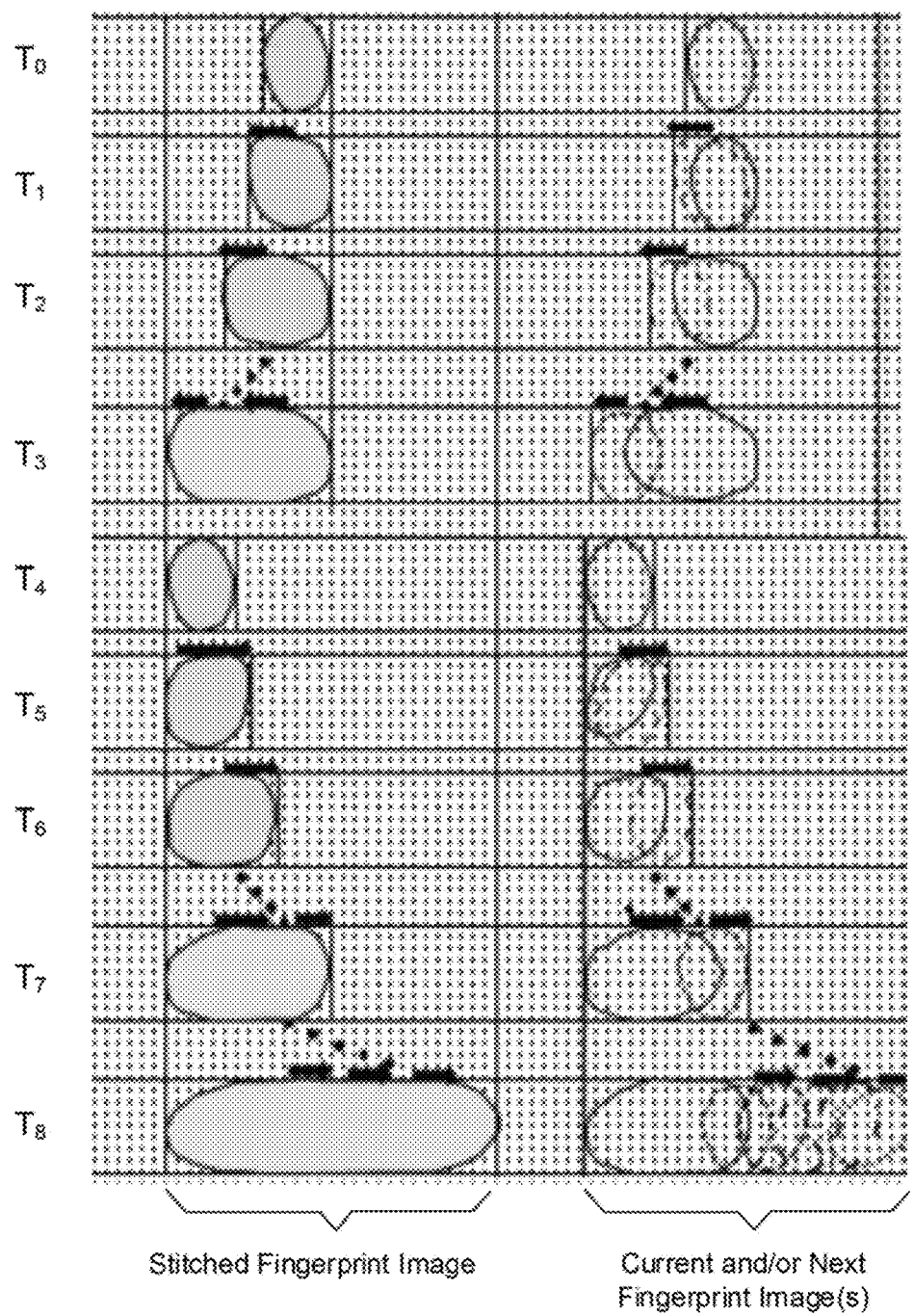
FIG. 13 illustrates another example of enrolling a fingerprint image by starting the rolling finger near a reference position of the sensing surface of a fingerprint enrollment apparatus according to aspects of the present disclosure.

FIG. 13 illustrates another example of enrolling a fingerprint image by starting the rolling finger near a reference position of the sensing surface of a fingerprint enrollment apparatus according to aspects of the present disclosure. In the example shown in FIG. 13, the finger starts substantially near the reference position of the sensing surface of a fingerprint enrollment apparatus, for example near the center of the sensing surface of a fingerprint enrollment apparatus, it then rolls first to the left and then to the right through the exemplary time instances $T_0$ to $T_8$. By starting the rolling finger substantially near the center of the sensing surface, this method may be configured to capture features of the finger more accurately and the stitched fingerprint image can be evenly distributed over the sensing surface of the fingerprint enrollment apparatus. This approach may also improve the efficiency of authenticating the fingerprint.

The right column represents the current and/or next fingerprint image(s) at each time instance $T_0$ to $T_8$. The left column represents the stitched fingerprint image at each time instance $T_0$ to $T_8$. In some implementations, upon detecting a change of direction of the rolling finger, the controller may keep the previously stitched fingerprint image as opposed to discarding the previously stitched fingerprint image at T4. The method of stitching the current fingerprint image and a next fingerprint image is described above in association with FIG. 6A through FIG. 6F.

According to aspects of the present disclosure, after a stitched fingerprint image is formed, a controller determines whether the stitched fingerprint image meets a set of fingerprint enrollment criteria. If the set of fingerprint enrollment criteria is met, the controller terminates capturing and processing additional fingerprint images, and the stitched fingerprint image is stored in a memory. If the set of fingerprint enrollment criteria is not met, the controller continues to capture and process additional fingerprint images as the finger rolls across the scan surface of the enrollment apparatus.

Figure 14:
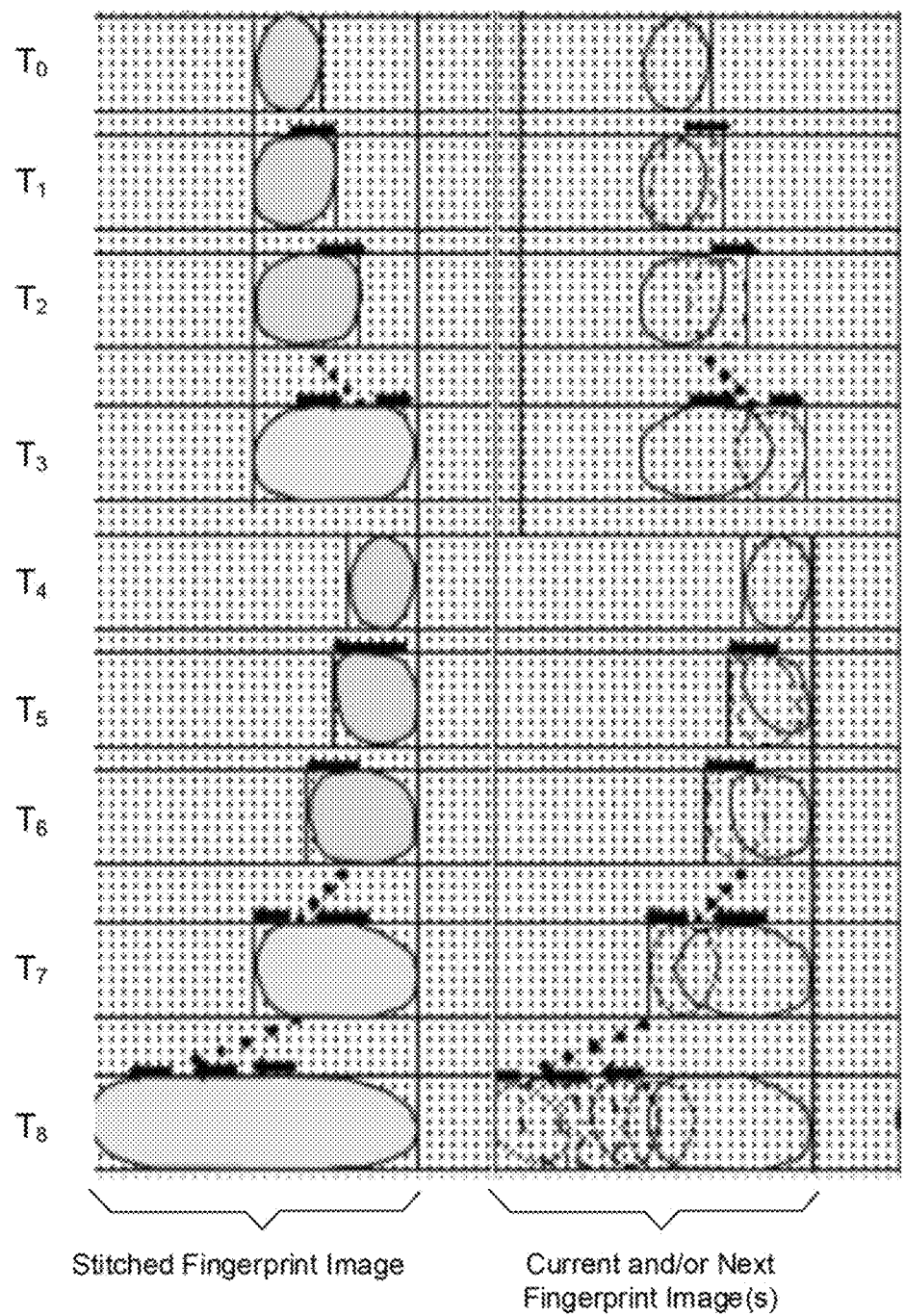
FIG. 14 illustrates yet another example of enrolling a fingerprint image by starting the rolling finger near a reference position of the sensing surface of a fingerprint enrollment apparatus according to aspects of the present disclosure.

FIG. 14 illustrates yet another example of enrolling a fingerprint image by starting the rolling finger near a reference position of the sensing surface of a fingerprint enrollment apparatus according to aspects of the present disclosure. In the example shown in FIG. 14, the finger starts substantially near the reference position of the sensing surface of a fingerprint enrollment apparatus, for example near the center of the sensing surface of a fingerprint enrollment apparatus, it then rolls first to the right and then to the left through the exemplary time instances $T_0$ to $T_8$. By starting the rolling finger substantially near the center of the sensing surface, this method may be configured to capture features of the finger more accurately and the stitched fingerprint image can be evenly distributed over the sensing surface of the fingerprint enrollment apparatus. This approach may also improve the efficiency of authenticating the fingerprint.

The right column represents the current and/or next fingerprint image(s) at each time instance $T_0$ to $T_8$. The left column represents the stitched fingerprint image at each time instance $T_0$ to $T_8$. In some implementations, upon detecting a change of direction of the rolling finger, the controller may keep the previously stitched fingerprint image as opposed to discarding the previously stitched fingerprint image at T4. The method of stitching the current fingerprint image and a next fingerprint image is described above in association with FIG. 6A through FIG. 6F.

Figure 15:
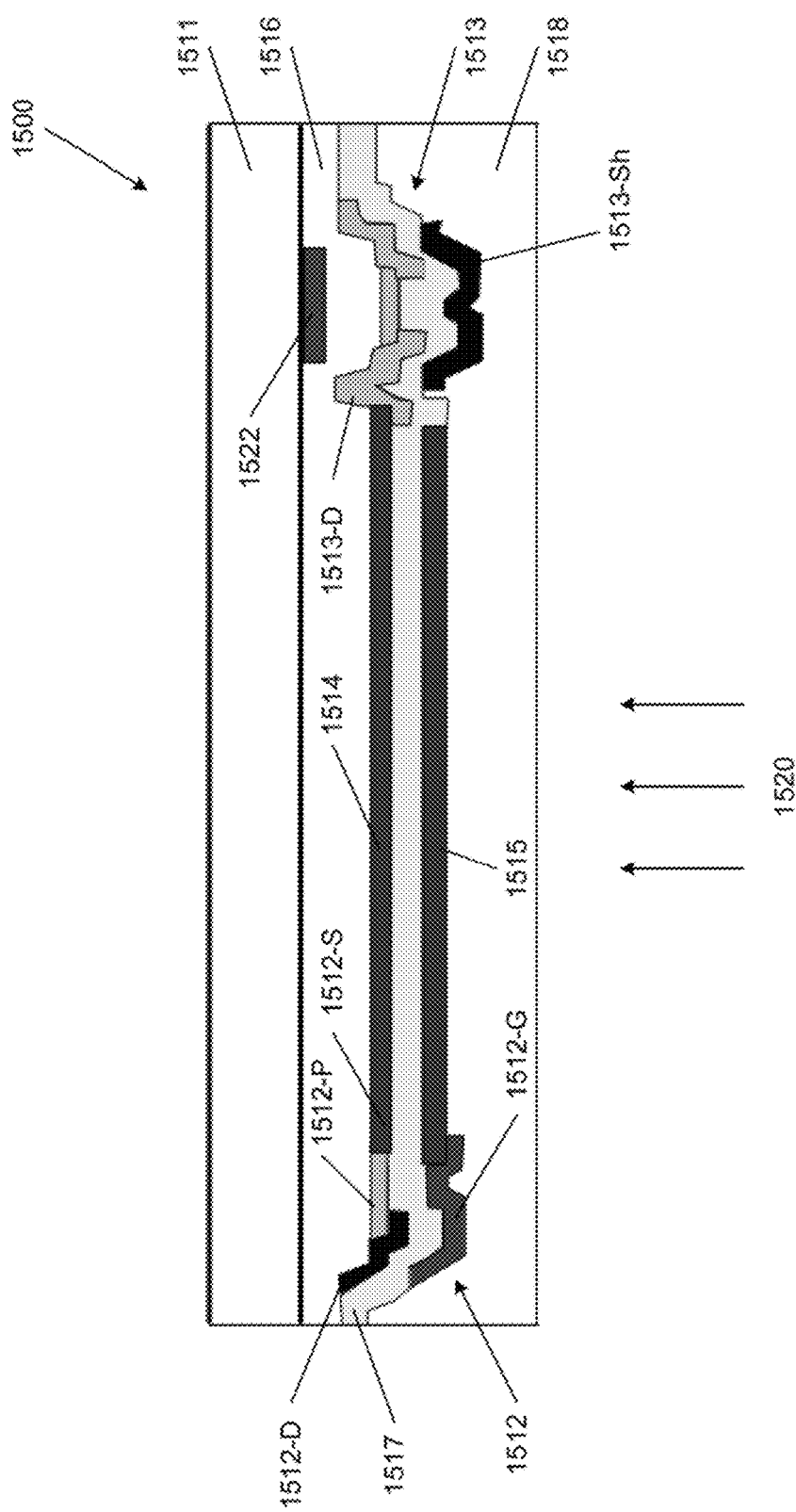
FIG. 15 illustrates an exemplary light sensing panel using a thin film transistor (TFT) panel structure according to aspects of the present disclosure.

FIG. 15 illustrates an exemplary light sensing panel using a thin film transistor (TFT) panel structure according to aspects of the present disclosure. Each cell of the TFT panel structure can be an addressable light sensing component, referred to as a sensing pixel. In the example shown in FIG. 15, capture sensor 1500 includes a passivation layer 1518, which can be formed of SiNx. On top of passivation layer 1518, a storage capacitor layer is formed including first electrode 1515. This storage capacitor layer is preferably formed from indium tin oxide (ITO), which is conductive and transparent. On top of first electrode 1515, an insulating layer 1517 is formed, preferably of SiNx. Over insulating layer 1517, a second electrode 1514 is formed, preferably of tin oxide. First electrode 1515, insulating layer 1517 and second electrode 1514 together form the storage capacitor. Over second electrode 1514, another insulating layer 1516 is formed, which can be formed from SiNx. A layer of glass layer 1511 is placed over insulating layer 1516. A fingerprint to be imaged is placed on glass layer 1511, which may be referred to herein as the imaging surface.

A light sensing unit 1512, which is preferably a thin-film transistor, and a switching unit 1513, which is also preferably a thin-film transistor, are horizontally arranged on a passivation layer 1518. Under passivation layer 1518, a back light 1520 irradiates light upward to be passed through the fingerprint capture sensor 1500. As shown in FIG. 15, back light 1520 can be separated from the lower, exposed surface of passivation layer 1518. It is also considered, however, that backlight 1520 may be placed against the lower surface of passivation layer 1518. Backlight 1520 can be an LED or any other type of light source. A source electrode 1512-S of the light sensing unit 1512 and a drain electrode 1513-D of the switching unit 1513 are electrically connected through second electrode 1514. A gate electrode 1512-G of the light sensing unit 1512 is connected to first electrode 1515. Additionally, a first light shielding layer 1513-*sh* is placed between insulating layer 1517 and passivation layer 1518 at switching unit 1513. As detailed below, the first light shielding layer 1513-*sh* blocks light from backlight 1520 from reaching switching unit 1513. Additionally, second light shielding layer 1522 is positioned between glass layer 1511 and insulating layer 1516 at switching unit 1513 to shield switching unit 1513 from light passing through or reflected from glass layer 1511.

In the above structure, a photosensitive layer 1512-P such as amorphous silicon (a-Si:H) is formed between the drain electrode 1512-D and source electrode 1512-S of the light sensing unit 1512. Note that photosensitive layer 1512-P allows current to flow in response to a predetermined amount of light striking a surface of the photosensitive layer 1512-P. In this way, when more than a predetermined quantity of light is received at the surface of photosensitive layer 1512-P, current flows through the drain electrode 1512-D and the source electrode 1512-S.

According to aspects of the present disclosure, in a method of fabricating capture sensor 1500, a second light shielding layer 1522 is first placed on glass layer 1511 via evaporation, sputtering or any other method. Glass layer 1511 is preferably between about 5 and 10 um thick, though it may be either thicker or thinner. Light shielding layer 1522 is preferably formed from a metal such as aluminum, but may be formed from any suitable light blocking material. Next, insulating layer 1516 is formed on top of glass layer 1511 and second light shielding layer 1522. As noted above, insulating layer 1516 is preferably formed from SiNx. Photosensitive layer 1512-P is then formed over insulating layer 116. As discussed above, a photosensitive layer 1512-P is preferably formed from a-Si:H. Source electrode 1512-D of light sensing unit 1512, second electrode 1514 and drain electrode 1513-D of switching unit 1513 are next formed over insulating layer 1516. Source electrode 1512-D, second electrode 1514 and drain electrode 1513-D are each preferably formed of ITO, but may be formed of any suitable conductor. Next, insulating layer 1517 is formed and over the insulating layer 1517 the first electrode 1515 is formed. Insulating layer 1517 is preferably formed from SiNx and the first electrode 1515 is preferably formed of ITO but may be formed of any suitable conductor. Next, gate electrode 1512-G of light sensing unit 1512 and light shield 113-*sh* are formed. Preferably, gate electrode 1512-G and light shielding layer 1513-*sh* are each formed of ITO, but may be formed of any suitable material and light shielding layer 1513-*sh* does not need to be formed from the same material as the gate electrode 1512-G. Next, passivation layer 1518, which is preferably formed from SiNx, is formed over first electrode 1515, gate electrode 1512-G and light shielding layer 1513-*sh*. As discussed above, backlight 1520 can either be attached to the lower, exposed surface of passivation layer 1518 or separately supported.

In another implementation, an image capture sensor can have substantially the same structure as the capture sensor shown in FIG. 15 except that a conductive ITO layer is placed beneath the glass layer and an insulating layer, which can be formed of SiNx, is placed below the ITO layer. Because the ITO layer is conductive, electrostatic charge built up on the glass layer can be discharged by connecting the ITO layer to a ground. This can prevent damage to the capture sensor. The image capture sensor can be fabricated in substantially the same manner except that the ITO layer is formed over the glass layer and the insulating layer is formed over the ITO layer prior to forming the light shielding layer over insulating layer.

In yet another implementation, an image capture sensor can have substantially the same structure as the capture sensor shown in FIG. 15. Specifically, the capture sensor includes a light sensing unit, which is substantially the same as light sensing unit, and switching unit, which is substantially the same as switching unit, formed between the insulating layer and the passivation layer. However, above the insulating layer the capture sensor includes a substrate layer having a plurality of fiber-optic strands running in a direction perpendicular to the surface of the substrate layer. Preferably, the diameter of the fiber-optic strands is 330a forming a substrate layer that is from about 4 um to about 8 um in diameter and more preferably about 6 um in diameter, though larger or smaller diameters can also be used. The substrate layer can be formed from glass fiber optic strands that are 330a or fiber optic strands of other substantially transparent materials including polymers. Fiber optic sheets can be used to form the substrate layer.

Figure 16:
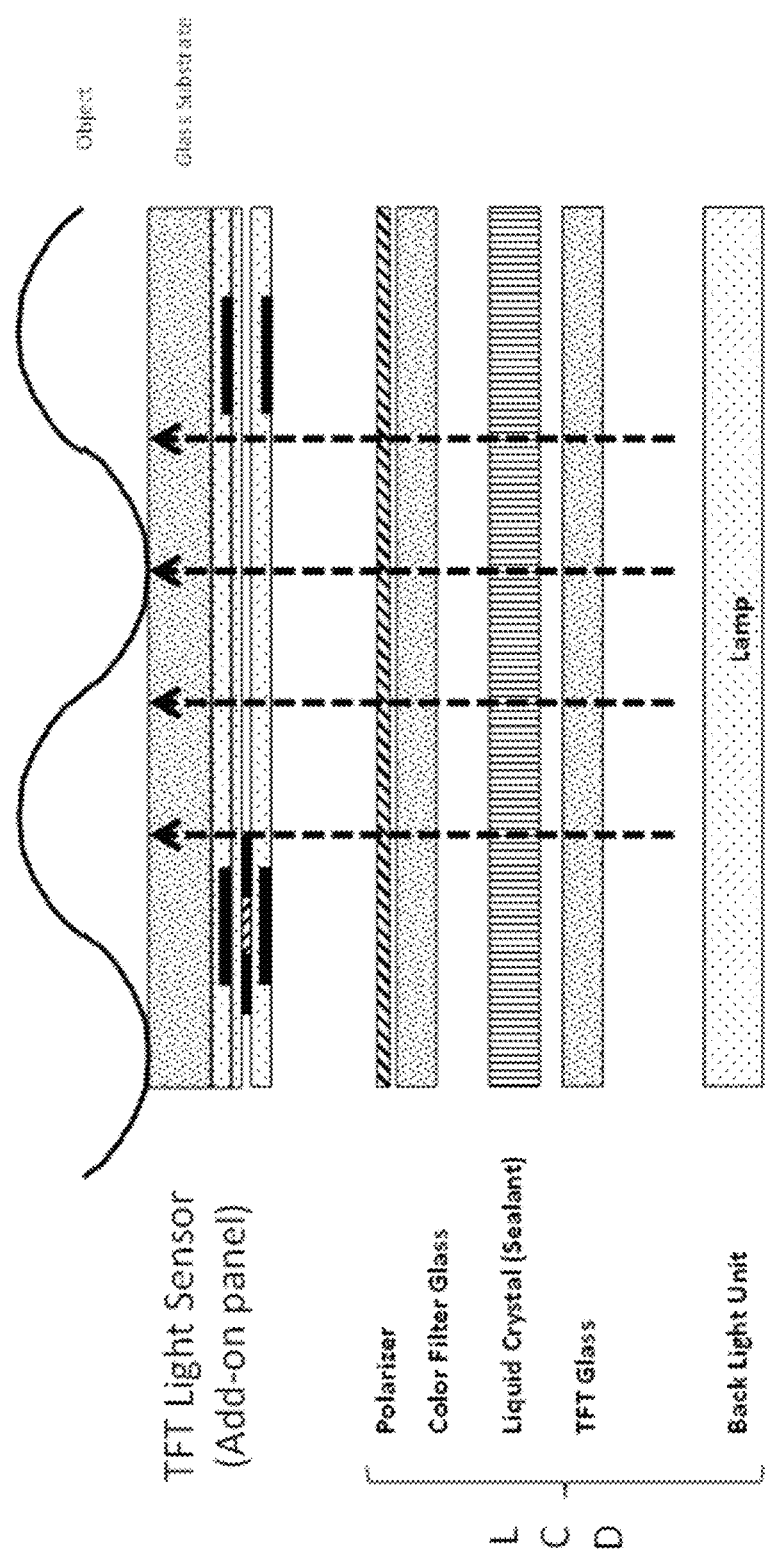
FIG. 16 illustrates an exemplary fingerprint detection system according to aspects of the present disclosure.

A light sensor panel can be implemented as an add-on panel that is placed on top of the light source panel. The light source panel can be, for example, an LCD panel or an AMOLED panel. FIG. 16 illustrates an exemplary fingerprint detection system, in which a TFT type light sensor panel is placed on top of an LCD display panel structure as an add-on panel. In this example, a TFT type light sensor panel is placed on top of an LCD panel structure as an add-on panel. The sensing pixels of the TFT type light sensing panel can be individually addressable and can be activated according to a designated sensor zone pattern.

Figure 17:
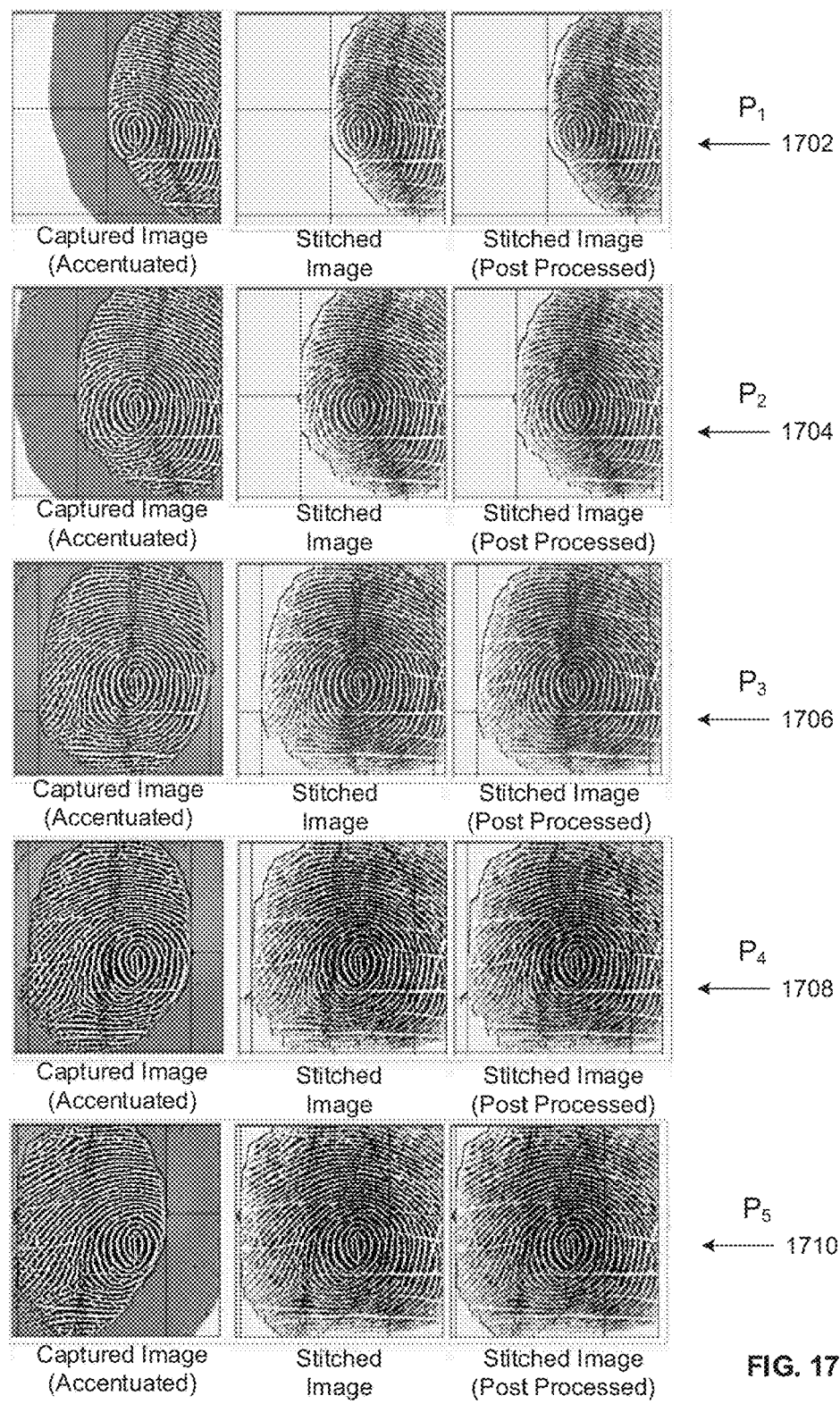
FIG. 17 illustrates an exemplary implementation of enhancing a stitched image as a finger rolls across a sensing surface of a fingerprint enrollment apparatus according to aspects of the present disclosure.

FIG. 17 illustrates an exemplary implementation of enhancing a stitched image as a finger rolls across a sensing surface of a fingerprint enrollment apparatus according to aspects of the present disclosure. Methods of forming a stitched image are described above in association with FIG. 2B-FIG. 2C and FIG. 5B-FIG. 5C, which are not repeated here. According to aspects of the present disclosure, prior to a stitched image being formed, a captured image may be enhanced with an accentuation process to form an accentuated image (which may still be referred to as the captured image for simplicity). The captured image may include either or both of the current image or a next image as a finger rolls across a sensing surface of the enrollment apparatus. The stitched image may be further enhanced with post processing. Examples of post processing may include noise removal, sharpening, contrast enhancement, etc.

As show in the example of FIG. 17, in a first time period $P_1$, indicated by arrow 1702, the left block illustrates a first captured image (which may be accentuated), the middle block illustrates a first stitched image, and the right block illustrates a first post-processed stitched image. Similarly, in a subsequent second time period $P_2$, indicated by arrow 1704, the left block illustrates a second captured image (which may be accentuated), the middle block illustrates a second stitched image, and the right block illustrates a second post-processed stitched image. In a subsequent third time period $P_3$, indicated by arrow 1706, the left block illustrates a third captured image (which may be accentuated), the middle block illustrates a third stitched image, and the right block illustrates a third post-processed stitched image. In a subsequent fourth time period $P_4$, indicated by arrow 1708, the left block illustrates a fourth captured image (which may be accentuated), the middle block illustrates a fourth stitched image, and the right block illustrates a fourth post-processed stitched image. In a subsequent fifth time period $P_5$, indicated by arrow 1710, the left block illustrates a fifth captured image (which may be accentuated), the middle block illustrates a fifth stitched image, and the right block illustrates a fifth post-processed stitched image. In this example, only five periods are shown. A person skilled in the art would understand that in actual implementations, there can be less than five periods or more than five periods.

According to aspects of the present disclosure, a captured fingerprint image of multiple fingers on the sensing surface can be segmented into multiple individual fingerprint images. There are gaps between individual fingers because a fingertip has a round shape on the bottom. Even if the fingers are placed tightly together and even if the user presses hard on the sensor surface, there are still gaps between the fingers due to the round shape of the bottom of the fingertip. The gaps can be narrower when the fingers are placed tightly together side by side and pressed hard on the sensing surface. Equations for the line in the middle of each gap between the fingers can be determined because the gaps for fingers are detected using the boundary information for each finger. The equations can be used to segment the fingers. If two fingers are captured in a fingerprint image, one line in the middle of the gap of the two fingers can be detected using the boundary information from the two fingers. The equation can be used to segment the two fingers into two individual finger images.

Figure 18:
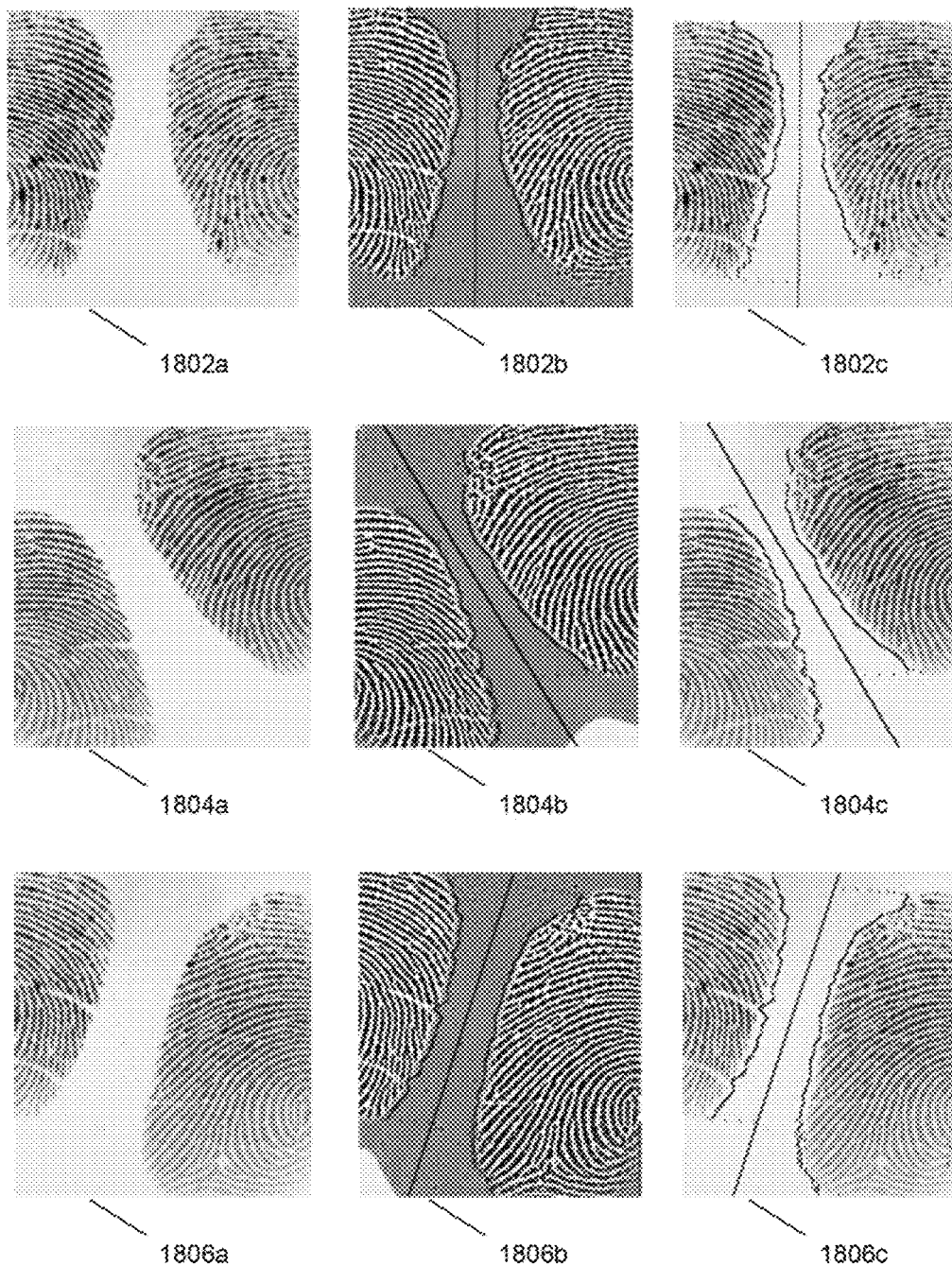
FIG. 18 illustrates exemplary implementations of segmenting two fingers having various slopes according to aspects of the present disclosure.

FIG. 18 illustrates exemplary implementations of segmenting two fingers having various slopes according to aspects of the present disclosure. In the example shown in FIG. 18, a first original multiple finger image 1802*a*, a first accentuated image 1802*b* with a line having a first slope segmenting the original multiple finger image 1802*a*, and a first non-accentuated image 1802*c* with a line having the first slope segmenting the original multiple finger image 1802*a* are shown as the first set of fingerprint images. A second original multiple finger image 1804*a*, a second accentuated image 1804*b* with a line having a second slope segmenting the original multiple finger image 1804*a*, and a second non-accentuated image 1804*c* with a line having the second slope segmenting the original multiple finger image 1804*a* are shown as the second set of fingerprint images. Similarly, a third original multiple finger image 1806*a*, a third accentuated image 1806*b* with a line having a third slope segmenting the original multiple finger image 1806*a*, and a third non-accentuated image 1806*c* with a line having the third slope segmenting the original multiple finger image 1806*a* are shown as the third set of fingerprint images.

Some portions of the detailed description that follows are presented in terms of flowcharts, logic blocks, and other symbolic representations of operations on information that can be performed on a computer system. A procedure, computer-executed step, logic block, process, etc., is here conceived to be a self-consistent sequence of one or more steps or instructions leading to a desired result. The steps are those utilizing physical manipulations of physical quantities. These quantities can take the form of electrical, magnetic, or radio signals capable of being stored, transferred, combined, compared, and otherwise manipulated in a computer system. These signals may be referred to at times as bits, values, elements, symbols, characters, terms, numbers, or the like. Each step may be performed by hardware, software, firmware, or combinations thereof.

It will be appreciated that the above descriptions for clarity have described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processors or controllers. Hence, references to specific functional units are to be seen as references to suitable means for providing the described functionality rather than indicative of a strict logical or physical structure or organization.

The invention can be implemented in any suitable form, including hardware, software, firmware, or any combination of these. The invention may optionally be implemented partly as computer software running on one or more data processors and/or digital signal processors. The elements and components of an embodiment of the invention may be physically, functionally, and logically implemented in any suitable way. Indeed, the functionality may be implemented in a single unit, in a plurality of units, or as part of other functional units. As such, the invention may be implemented in a single unit or may be physically and functionally distributed between different units and processors.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the invention to the precise forms disclosed. Many modifications and variations are possible in view of the above teachings. The embodiments were chosen and described to explain the principles of the invention and their practical applications, and to enable others skilled in the art to best utilize the invention and various embodiments with various modifications as suited to the particular use contemplated.

What is claimed is:

1. A method for simultaneous interactive multiple fingerprint enrollment, comprising:
   instructing, by a controller, a user to present a randomly selected set of multiple fingers on a sensing surface of an enrollment apparatus interactively;
   capturing, by an image sensor, a fingerprint image of the multiple fingers on the sensing surface simultaneously;
   identifying, by the controller, boundaries of the multiple fingers by scanning from edges of the sensing surface of the enrollment apparatus;
   segmenting, by the controller, the fingerprint image into a plurality of individual fingerprint images based on the identified boundaries, comprising identifying a first boundary of a first finger and a second boundary of a second finger, determining a plurality of points wherein each point has similar distance from the first boundary of the first finger and the second boundary of the second finger, generating a line that represents a fit to the plurality of points, and separating the first finger and the second finger in the fingerprint image using the line; and
   storing, in a memory, the individual fingerprint images.

2. The method of claim 1, further comprising:
   comparing, by the controller, the plurality of individual fingerprint images against a plurality of corresponding individual fingerprint images in a database; and
   authenticating, by the controller, the user based on a result of the comparison.

3. The method of claim 1, wherein the randomly selected set of multiple fingers comprises:
a finger from a left hand and a finger from a right hand;
a finger from the left hand and two fingers from the right hand;
a finger from the right hand and two fingers from the left hand; or
multiple fingers from the left hand and multiple fingers from the right hand.

4. The method of claim 1, further comprising:
accentuating fingerprint features of the fingerprint image of the multiple fingers.

5. The method of claim 4, wherein accentuating fingerprint features of the fingerprint image comprises:
constructing a histogram of tonality values of the fingerprint image;
determining differences between the histogram of tonality values of the fingerprint image to a histogram of tonality values of a reference fingerprint image; and
adjusting a brightness of the fingerprint image based on the differences between the histogram of tonality values of the fingerprint image to the histogram of tonality values of the reference fingerprint image.

6. The method of claim 5, wherein adjusting the brightness of the fingerprint images comprises:
adjusting the brightness of the fingerprint images in proportion to the differences between the histogram of tonality values of the fingerprint image to a histogram of tonality values of a reference fingerprint image;
adjusting the brightness of the fingerprint images based on the differences between the histogram of tonality values of the fingerprint image to a histogram of tonality values of a reference fingerprint image using a lookup table generated from empirical data; or
adjusting the brightness of the fingerprint images based on the differences between the histogram of tonality values of the fingerprint image to a histogram of tonality values of a reference fingerprint image using a function generated from the empirical data.

7. The method of claim 1, wherein identifying boundaries of the multiple fingers further comprises:
from each edge of the sensing surface of the enrollment apparatus,
scanning towards the randomly selected set of multiple fingers to detect a boundary of the fingerprint image.

8. The method of claim 7, further comprising:
traversing the boundary of the fingerprint image;
repeating the process of:
moving away from the boundary until a first pixel location that no longer has high contrast with respect to its neighboring pixels;
moving towards the boundary until a second pixel location that has high contrast with respect to its neighboring pixels;
marking the first pixel location and the second pixel location as transition pixels; and
updating the boundary using the transition pixels identified.

9. The method of claim 7, wherein scanning towards the randomly selected set of multiple fingers to detect a boundary of the fingerprint image comprises:
identifying a number of consecutive pixels that have differences of grayscale values less than a reference number of consecutive pixels; and
ignoring the number of consecutive pixels that have differences of grayscale values less than a reference number of consecutive pixels as background noise.

10. The method of claim 7, further comprising:
traversing the boundary of the fingerprint image;
identifying an outlier pixel that is different from its neighboring pixels; and
replacing the outlier pixel with a pixel having average value of its neighboring pixels.

11. An apparatus for simultaneous interactive multiple fingerprint enrollment, comprising:
a controller configured to instruct a user to present a randomly selected set of multiple fingers on a sensing surface of an enrollment apparatus interactively;
an image sensor configured to capture a fingerprint image of the multiple fingers on the sensing surface simultaneously;
the controller is further configured to identify boundaries of the multiple fingers by scanning from edges of the sensing surface of the enrollment apparatus;
the controller is further configured to segment the fingerprint image into a plurality of individual fingerprint images based on the identified boundaries, comprising identify a first boundary of a first finger and a second boundary of a second finger, determine a plurality of points wherein each point has similar distance from the first boundary of the first finger and the second boundary of the second finger, generate a line that represents a fit to the plurality of points, and separate the first finger and the second finger in the fingerprint image using the line; and
a memory configured to store the individual fingerprint images.

12. The apparatus of claim 11, wherein the controller is further configured to:
compare the plurality of individual fingerprint images against a plurality of corresponding individual fingerprint images in a database; and
authenticate the user based on a result of the comparison.

13. The apparatus of claim 11, wherein the randomly selected set of multiple fingers comprises:
a finger from a left hand and a finger from a right hand;
a finger from the left hand and two fingers from the right hand;
a finger from the right hand and two fingers from the left hand; or
multiple fingers from the left hand and multiple fingers from the right hand.

14. The apparatus of claim 11, wherein the controller is further configured to:
accentuate fingerprint features of the fingerprint image of the multiple fingers.

15. The apparatus of claim 14, wherein the controller is further configured to:
construct a histogram of tonality values of the fingerprint image;
determine differences between the histogram of tonality values of the fingerprint image to a histogram of tonality values of a reference fingerprint image; and
adjust a brightness of the fingerprint image based on the differences between the histogram of tonality values of the fingerprint image to the histogram of tonality values of the reference fingerprint image.

16. The apparatus of claim 15, wherein the controller is further configured to:
adjust the brightness of the fingerprint images in proportion to the differences between the histogram of tonality values of the fingerprint image to a histogram of tonality values of a reference fingerprint image;

adjust the brightness of the fingerprint images based on the differences between the histogram of tonality values of the fingerprint image to a histogram of tonality values of a reference fingerprint image using a lookup table generated from empirical data; or adjust the brightness of the fingerprint images based on the differences between the histogram of tonality values of the fingerprint image to a histogram of tonality values of a reference fingerprint image using a function generated from the empirical data.

17. The apparatus of claim 11, wherein the controller is further configured to:

from each edge of the sensing surface of the enrollment apparatus, scan towards the randomly selected set of multiple fingers to detect a boundary of the fingerprint image.

18. The apparatus of claim 17, wherein the controller is further configured to:

traverse the boundary of the fingerprint image; and repeat the process of:

move away from the boundary until a first pixel location that no longer has high contrast with respect to its neighboring pixels;

move towards the boundary until a second pixel location that has high contrast with respect to its neighboring pixels;

mark the first pixel location and the second pixel location as transition pixels; and update the boundary using the transition pixels identified.

19. The apparatus of claim 17, wherein the controller is further configured to:

identify a number of consecutive pixels that have differences of grayscale values less than a reference number of consecutive pixels; and ignore the number of consecutive pixels that have differences of grayscale values less than a reference number of consecutive pixels as background noise.

20. The apparatus of claim 17, wherein the controller is further configured to:

traverse the boundary of the fingerprint image;

identify an outlier pixel that is different from its neighboring pixels; and replace the outlier pixel with a pixel having average value of its neighboring pixels.

* * * * *